(12) United States Patent
Deshpande

(10) Patent No.: US 11,265,605 B2
(45) Date of Patent: Mar. 1, 2022

(54) RATINGS INFORMATION

(71) Applicant: Sharp Kabushiki Kaisha, Sakai (JP)

(72) Inventor: Sachin G. Deshpande, Camas, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/108,029

(22) Filed: Dec. 1, 2020

(65) Prior Publication Data

US 2021/0136449 A1    May 6, 2021

Related U.S. Application Data

(63) Continuation of application No. 16/310,891, filed as application No. PCT/JP2017/022671 on Jun. 20, 2017, now Pat. No. 10,917,692.

(60) Provisional application No. 62/352,521, filed on Jun. 20, 2016.

(51) Int. Cl.
*H04N 21/462* (2011.01)
*H04N 21/84* (2011.01)
*H04N 21/845* (2011.01)
*H04N 21/438* (2011.01)

(52) U.S. Cl.
CPC ....... *H04N 21/462* (2013.01); *H04N 21/4382* (2013.01); *H04N 21/84* (2013.01); *H04N 21/8402* (2013.01); *H04N 21/8456* (2013.01)

(58) Field of Classification Search
CPC ............ H04N 21/462; H04N 21/4382; H04N 21/8402
See application file for complete search history.

(56) References Cited

U.S. PATENT DOCUMENTS

2009/0083785 A1*    3/2009    Choi ................. H04H 20/30
                                                            725/28

OTHER PUBLICATIONS

Deshpande, "Ratings Information", U.S. Appl. No. 16/310,891, filed Dec. 18, 2018.

* cited by examiner

*Primary Examiner* — Nasser M Goodarzi
*Assistant Examiner* — Adil Ocak
(74) *Attorney, Agent, or Firm* — Keating & Bennett, LLP

(57) ABSTRACT

A system for content advisory ratings information.

5 Claims, 36 Drawing Sheets

| Name | Type | Category | Cardinality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| ContentAdvisoryRatings | E2 | NM/TM | 0..N | Content advisory rating one for each rating region. Contains the following elements: RegionIdentifier RatingDescription RatedDimensions RatingDimVal | |
| RegionIdentifier | E3 | NM/TM | 0..1 | Specifies the rating region for which the following rating description and rating dimension, rating value data is specified. If not present the value of RegionIdentifier is inferred to be 0. | unsignedByte |
| RatingDescription | E3 | NM/TM | 1 | Rating description text which represents the rating suitable for on-screen display. Contains the following attribute: xml:lang | string |
| xml:lang | A | NM/TM | 0..1 | The language of the RatingDescription expressed with XML attribute 'xml:lang' | string |
| RatedDimensions | E3 | NM/TM | 0..1 | The number of region specific rating dimensions for which content advisory rating is specified. | unsignedByte |
| RatingDimVal | E3 | NM/TM | 1..N | Content advisory rating dimension and rating value for each rated dimension. Contains the following elements: RatingDimension RatingValue | |
| RatingDimension | E4 | NM/TM | 0..1 | Rating dimension index for which the rating value is specified. | unsignedByte |
| RatingValue | E4 | NM/TM | 1 | Rating value for the rating dimension specified in the associated RatingDimension element. Contains the following attribute: xml:lang | unsignedByte |

Content Advisory Ratings in Service Announcement inside a Service fragment

| Name | Type | Category | Cardinality | Description | Data Type |

| Name | Type | Category | Cardinality | Description | Data Type |
|---|---|---|---|---|---|
| ContentAdvisoryRatings | E1 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E2 | NM/TM | 0..1 | Specifies the rating region for which the following rating description and rating dimension, rating value data is specified. If not present the value of RegionIdentifier is inferred to be 0. | unsignedByte |
| RatingDescription | E2 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E2 | NM/TM | 0..1 | The number of region specific rating dimensions for which content advisory rating is specified. | unsignedByte |
| RatingDimVal | E2 | NM/TM | 1..N | Content advisory rating dimension and rating value for each rated dimension. Contains the following elements:<br>RatingDimension<br>RatingValue | |
| RatingDimension | E3 | NM/TM | 0..1 | Rating dimension index for which the rating value is specified. | unsignedByte |
| RatingValue | E3 | NM/TM | 1 | Rating value for the rating dimension specified in the associated RatingDimension element. | unsignedByte |

Content Advisory Ratings in Service Announcement

FIG. 5

| RatingDescription | E2 | NM/TM | 1..N | Rating description text which represents the rating suitable for on-screen display. Contains the following attribute:<br>xml:lang | string |

| RegionIdentifier | E2 | NM/TM | 1 | Specifies the rating region for which the following rating description and rating dimension, rating value data is specified. | unsignedByte |

FIG. 7B

| RatingDimension | E3 | NM/TM | 1 | Rating dimension index for which the rating value is specified. | unsignedByte |

FIG. 7C

```
<?xml version="1.0" encoding="UTF-8"?>
<xs:schema xmlns:xs="http://www.w3.org/2001/XMLSchema">
  <xs:import namespace="http://www.w3.org/XML/1998/namespace"
    schemaLocation="http://www.w3.org/2001/xml.xsd"/>
  <xs:element name="ContentAdvisoryRatings" type="CARatingType"/>
  <xs:complexType name="CARatingType">
    <xs:sequence>
      <xs:element name="RegionIdentifier" type="xs:unsignedByte" minOccurs="0" maxOccurs="1"/>
      <xs:element name="RatingDescription" maxOccurs="1">
        <xs:complexType>
          <xs:simpleContent>
            <xs:extension base="xs:string">
              <xs:attribute ref="xml:lang" use="optional" default="en"/>
            </xs:extension>
          </xs:simpleContent>
        </xs:complexType>
      </xs:element>
      <xs:element name="RatedDimensions" type="xs:unsignedByte" minOccurs="0" maxOccurs="1"/>
      <xs:element name="RatingDimVal" type="RatingDimValType" minOccurs="1"
        maxOccurs="unbounded"/>
    </xs:sequence>
  </xs:complexType>

<xs:complexType name="RatingDimValType">
    <xs:sequence>
      <xs:element name="RatingDimension" type="xs:unsignedByte" minOccurs="0" maxOccurs="1"/>
      <xs:element name="RatingValue" type="xs:unsignedByte" minOccurs="1"/>
    </xs:sequence>
  </xs:complexType>
</xs:schema>
```

FIG. 8

```
<xs:element name="RatingDescription" maxOccurs="1">
    <xs:complexType>
        <xs:simpleContent>
            <xs:extension base="xs:string">
                <xs:attribute ref="xml:lang" use="optional" default="en"/>
            </xs:extension>
        </xs:simpleContent>
    </xs:complexType>
</xs:element>
```

FIG. 9A

```
<xs:element name="RatingDescription" minOccurs="1" maxOccurs="unbounded">
    <xs:complexType>
        <xs:simpleContent>
            <xs:extension base="xs:string">
                <xs:attribute ref="xml:lang" use="optional" default="en"/>
            </xs:extension>
        </xs:simpleContent>
    </xs:complexType>
</xs:element>
```

FIG. 9B

| Name | Type | Category | Cardinality | Description | Data Type |
|---|---|---|---|---|---|
| atsc:ContentAdvisoryRatings | E1 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings in Service Announcement

FIG. 10A

| Name | Type | Category | Cardinality | Description | Data Type |
|---|---|---|---|---|---|
| atsc:ContentAdvisoryRatings | E1 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings in Service Announcement

FIG. 10B

| Syntax | No Bits | Format |
|---|---|---|
| content_advisory_ratings_descriptor(){<br>    reserved<br>    rating_region_count<br>    for (i=0; i<rating_region_count; i++){<br>        rating_region<br>        rated_dimensions<br>        for (j=0; j<rated_dimensions; j++){<br>            rating_dimension j<br>            reserved<br>            rating_value<br>        }<br>        rating_description_length<br>        rating_description_text()<br>    }<br>} | 2<br>6<br><br>8<br>8<br><br>8<br>4<br>4<br><br>8<br>var | '00'<br><br><br><br>uimsbf<br>uimsbf<br><br>uimsbf<br>'0000'<br>uimsbf<br><br>uimsbf |

Binary / Stream Syntax for Content Advisory Ratings Description

FIG. 11

| Name | Type | Category | Cardinality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| ContentAdvisoryRatings | E2 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E3 | NM/TM | 0..1 | Specifies the rating region for which the following rating description and rating dimension, rating value data is specified. If not present the value of RegionIdentifier is inferred to be 0. | unsignedByte |
| RatingDescription | E3 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E3 | NM/TM | 0..1 | The number of region specific rating dimensions for which content advisory rating is specified. | unsignedByte |
| RatingDimVal | E3 | NM/TM | 1..N | Content advisory rating dimension and rating value for each rated dimension. Contains the following elements:<br>RatingDimension<br>RatingValue | |
| RatingDimension | E4 | NM/TM | 0..1 | Rating dimension index for which the rating value is specified. | unsignedByte |
| RatingValue | E4 | NM/TM | 1 | Rating value for the rating dimension specified in the associated RatingDimension element. Contains the following attribute:<br>xml:lang | unsignedByte |

Content Advisory Ratings in Service Announcement inside a Service fragment

FIG. 12

| Name | Type | Category | Cardinality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings in Service Announcement inside a Service fragment

FIG. 13

| Name | Type | Category | Cardinality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings in Service Announcement inside a Service fragment

FIG. 14

| Name | Type | Category | Cardinality | Description | Data Type |
|---|---|---|---|---|---|
| Content | E | | | 'Content' fragment<br>... | |
| ... | | | | | |
| PrivateExt | E1 | NO/TM | 0..1 | An element serving as a container for proprietary or application-specific extensions. | |
| ContentAdvisoryRatings | E2 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E3 | NM/TM | 0..1 | Specifies the rating region for which the following rating description and rating dimension, rating value data is specified. If not present the value of RegionIdentifier is inferred to be 0. | unsignedByte |
| RatingDescription | E3 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E3 | NM/TM | 0..1 | The number of region specific rating dimensions for which content advisory rating is specified. | unsignedByte |
| RatingDimVal | E3 | NM/TM | 1..N | Content advisory rating dimension and rating value for each rated dimension. Contains the following elements:<br>RatingDimension<br>RatingValue | |
| RatingDimension | E4 | NM/TM | 0..1 | Rating dimension index for which the rating value is specified. | unsignedByte |
| RatingValue | E4 | NM/TM | 1 | Rating value for the rating dimension specified in the associated RatingDimension element. Contains the following attribute:<br>xml:lang | unsignedByte |

Content Advisory Ratings in Service Announcement inside a Content fragment

FIG. 15

| Name | Type | Category | Card-inality | Description | Data Type |
|---|---|---|---|---|---|
| Content | E | | | 'Content' fragment ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings in Service Announcement inside a Content fragment

FIG. 16

| Name | Type | Category | Card-inality | Description | Data Type |
|---|---|---|---|---|---|
| Content | E | | | 'Content' fragment ... | |
| ... | | | | | |
| PrivateExt | E1 | NO/TM | 0..1 | An element serving as a container for proprietary or application-specific extensions. | |
| atsc:ContentAdvisoryRatings | E2 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings in Service Announcement inside a Content fragment

FIG. 17

| | | | | | |
|---|---|---|---|---|---|
| Components | E2 | NM/TM | 0..1 | Component sub-element.<br>Contains the following elements:<br>    AudioComponent<br>    VideoComponent<br>    CCComponent<br>    AppComponent | |
| AudioComponent | E3 | NM/TM | 0..N | Role of the component.<br>Textual description intended for human consumption regarding role of the component.<br>Strings which could be used to describe role of component of ATSC3.0 service include:<br>  "Complete main"<br>  "Music"<br>  "Dialog"<br>  "Effects"<br>  "Visually impaired"<br>  "Hearing impaired"<br>  "Commentary"<br><br>Any other useful description for a viewer can be provided.<br>Contains the following elements:<br>  ContentAdvisoryRatings<br>    Contains the following attribute:<br>  language | string |
| language | A | NM/TM | 0..1 | This element declares for the end users that this component is available in the language represented by the value of this element.<br><br>The textual value of this element can be made available for the end users in different languages. In such a case the language used to represent the value of this element is signaled using the built-in XML attribute 'xml:lang'. See section [7] Multi-language support. | String |
| VideoComponent | E3 | NM/TM | 0..N | Role of the component.<br>Textual description intended for human consumption regarding role of the component.<br>Strings which could be used to describe role of component of ATSC3.0 service include:<br>  "Primary video"<br>  "Alternative camera view"<br>  "Other alternative video component"<br>  "Sign language inset"<br>  "Follow subject video"<br>  "3D video left/right view"<br>  "3D video depth information"<br>  "Part of video array <x,y> of <n,m>" | string |

FIG. 18A

| | | | | | |
|---|---|---|---|---|---|
| | | | | "Follow-Subject metadata"<br><br>Any other useful description for a viewer can be provided.<br>Contains the following elements:<br>   ContentAdvisoryRatings<br>      Contains the following attribute:<br>         language | |
| language | A | NM/TM | 0..1 | This element declares for the end users that this component is available in the language represented by the value of this element.<br><br>The textual value of this element can be made available for the end users in different languages. In such a case the language used to represent the value of this element is signaled using the built-in XML attribute 'xml:lang'. See section [7] Multi-language support. | String |
| CCComponent | E3 | NM/TM | 0..N | Role of the component.<br>Textual description intended for human consumption regarding role of the component.<br>Strings which could be used to describe role of component of ATSC3.0 service include:<br>   "Normal"<br>   "Easy reader"<br><br>Any other useful description for a viewer can be provided.<br>Contains the following elements:<br>   ContentAdvisoryRatings<br>      Contains the following attribute:<br>         language | |
| language | A | NM/TM | 0..1 | This element declares for the end users that this component is available in the language represented by the value of this element.<br><br>The textual value of this element can be made available for the end users in different languages. In such a case the language used to represent the value of this element is signaled using the built-in XML attribute 'xml:lang'. See section [7] Multi-language support. | String |
| AppComponent | E2 | NM/TM | 0..N | Role of the component.<br>Textual description intended for human consumption regarding role of the component. | |

FIG. 18B

| | | | | Strings which could be used to describe role of component of ATSC3.0 service include:<br>"On Demand"<br>"Start-over"<br>"Companion-Screen"<br><br>Any other useful description for a viewer can be provided.<br>Contains the following elements:<br>    ContentAdvisoryRatings<br>        Contains the following attribute:<br>    language | |
|---|---|---|---|---|---|
| language | A | NM/TM | 0..1 | This element declares for the end users that this component is available in the language represented by the value of this element.<br>    The textual value of this element can be made available for the end users in different languages. In such a case the language used to represent the value of this element is signaled using the built-in XML attribute 'xml:lang'. See section [7] Multi-language support. | String |

Content Advisory Ratings in Service Announcement inside each
component in Content fragment

FIG. 18C

| Name | Type | Category | Card-inality | Description | Data Type |
|---|---|---|---|---|---|
| ContentAdvisoryRatings | E4 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E5 | NM/TM | 0..1 | Specifies the rating region for which the following rating description and rating dimension, rating value data is specified. If not present the value of RegionIdentifier is inferred to be 0. | unsignedByte |
| RatingDescription | E5 | NM/TM | 1 | Rating description text which represents the rating suitable for on-screen display. Contains the following attribute:<br>xml:lang | string |
| xml:lang | A | NM/TM | 0..1 | The language of the RatingDescription expressed with XML attribute 'xml:lang' | string |
| RatedDimensions | E5 | NM/TM | 0..1 | The number of region specific rating dimensions for which content advisory rating is specified. | unsignedByte |
| RatingDimVal | E5 | NM/TM | 1..N | Content advisory rating dimension and rating value for each rated dimension. Contains the following elements:<br>RatingDimension<br>RatingValue | |
| RatingDimension | E6 | NM/TM | 0..1 | Rating dimension index for which the rating value is specified. | unsignedByte |
| RatingValue | E6 | NM/TM | 1 | Rating value for the rating dimension specified in the associated RatingDimension element. Contains the following attribute:<br>xml:lang | unsignedByte |

Content Advisory Ratings elements inside each component in Content fragment

FIG. 19

| Name | Type | Category | Card-inality | Description | Data Type |
|---|---|---|---|---|---|
| atsc:ContentAdvisoryRatings | E4 | NM/TM | 0..1 | Content advisory rating for each rating region. For each rating region rating value is provided for one or more rating dimensions. The content within the string is binary representation of the PSIP Content Advisory Descriptor. | string |

Content Advisory Ratings elements inside each component in Content fragment

FIG. 20

| Name | Type | Category | Cardinality | Description | Data Type |
|---|---|---|---|---|---|
| atsc:ContentAdvisoryRatings | E4 | NM/TM | 0..1 | Content advisory rating for each rating region. For each rating region rating value is provided for one or more rating dimensions. The content within the string is base64 encoded binary data. The binary data is PSIP Content Advisory Descriptor. | base64Binary |

Content Advisory Ratings elements inside each component in Content fragment

FIG. 21

← import: http://www.w3.org/XML/1998/namespace (http://www.w3.org/2001/xml.xsd)

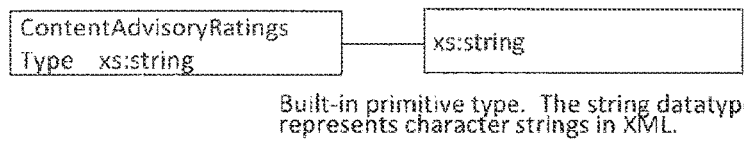

Built-in primitive type. The string datatype represents character strings in XML.

Content Advisory Ratings Information Struture

FIG. 22A

← import: http://www.w3.org/XML/1998/namespace (http://www.w3.org/2001/xml.xsd)

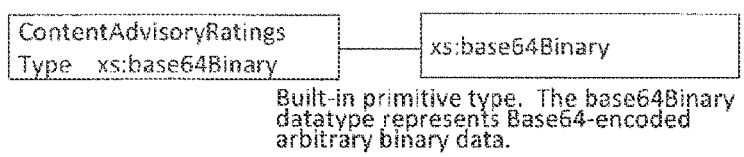

Built-in primitive type. The base64Binary datatype represents Base64-encoded arbitrary binary data.

Content Advisory Ratings Information Struture

FIG. 22B

```
<?xml version="1.0" encoding="UTF-8"?>
<xs:schema xmlns:xs="http://www.w3.org/2001/XMLSchema">
    <xs:import namespace="http://www.w3.org/XML/1998/namespace"
        schemaLocation="http://www.w3.org/2001/xml.xsd"/>
    <xs:element name="ContentAdvisoryRatings" type="xs:string"/>
</xs:schema>
```

XML schema for content advisory ratings information

FIG. 23A

```
<?xml version="1.0" encoding="UTF-8"?>
<xs:schema xmlns:xs="http://www.w3.org/2001/XMLSchema">
    <xs:import namespace="http://www.w3.org/XML/1998/namespace"
        schemaLocation="http://www.w3.org/2001/xml.xsd"/>
    <xs:element name="ContentAdvisoryRatings" type="xs:base64Binary"/>
</xs:schema>
```

XML schema for content advisory ratings information

FIG. 23B

| Name | Type | Category | Cardinality | Description | Data Type |
|---|---|---|---|---|---|
| ContentAdvisoryRatings | E1 | NM/TM | 0..N | Content advisory rating one for each rating region.<br>Contains the following elements:<br>RegionIdentifier<br>RatingDescription<br>RatedDimensions<br>RatingDimVal | |
| RegionIdentifier | E2 | NM/TM | 0..1 | Specifies the rating region for which the following rating description and rating dimension, rating value data is specified. If not present the value of RegionIdentifier is inferred to be 0. | unsignedByte |
| RatingDescription | E2 | NM/TM | 1 | Rating description text which represents the rating suitable for on-screen display.<br>Contains the following attribute:<br>xml:lang | string |
| xml:lang | A | NM/TM | 0..1 | The language of the RatingDescription expressed with XML attribute 'xml:lang' | string |
| RatedDimensions | E2 | NM/TM | 0..1 | The number of region specific rating dimensions for which content advisory rating is specified. | unsignedByte |
| RatingDimVal | E2 | NM/TM | 1..N | Content advisory rating dimension and rating value for each rated dimension. Contains the following elements:<br>RatingDimension<br>RatingValue<br>RatingValueString | |
| RatingDimension | E3 | NM/TM | 0..1 | Rating dimension index for which the rating value is specified. | unsignedByte |
| RatingValue | E3 | NM/TM | 1 | Rating value for the rating dimension specified in the associated RatingDimension element.<br>Contains the following attribute:<br>xml:lang | unsignedByte |
| RatingValueString | E3 | NM/TM | 1 | Rating value text string for the rating dimension specified in the associated RatingDimension element. | String |

Content Advisory Ratings in Service Announcement

FIG. 24

| Name | Type | Category | Cardinality | Description | Data Type |
|---|---|---|---|---|---|
| RatingValueString | E3 | NM/TM | 0..1 | Rating value text string for the rating dimension specified in the associated RatingDimension element. | String |

Part of Content Advisory Ratings in Service Announcement

FIG. 25

| Name | Type | Category | Card-inality | Description | Data Type |
|---|---|---|---|---|---|
| xml:lang | A | NM/TM | 0..1 | The language of the RatingDescriptionText expressed with XML attribute 'xml:lang' | string |

Part of Content Advisory Ratings in Service Announcement

FIG. 26

| Name | Type | Category | Card-inality | Description | Data Type |
|---|---|---|---|---|---|
| RRTParentalGuidanceType | E1 | NM/TM | 0..N | Content advisory rating - one for each rating region.<br><br>This element provides definition for specifying a parental guidance rating that conforms to the structure of a single instance of the rating_region loop in the ATSC Content Advisory Descriptor [2]. In any element of RRTParentalGuidanceType type, the ratingRegion value shall match the ratingRegion value of a Rating Region Table approved by a standards or regulatory body applicable to the region of interest, and each ratingDimension of the instance match a ratingDimension that appears in that Rating Region Table, and the ratingValue associated with a ratingDimension in the instance match a ratingValue for the corresponding dimension in that Rating Region Table<br><br>Contains the following elements:<br>Dimension<br>RatingDescriptionText<br>Contains the following attribute:<br>ratingRegion | |
| ratingRegion | A | NM/TM | 0..1 | Code number for the rating region to which this parental guidance rating applies, corresponding to the rating_region field in the ATSC Content Advisory Descriptor [2].<br><br>If not present the value of ratingRegion is inferred to be 0. | unsignedByte |
| Dimension | E2 | NM/TM | 1..N | Content advisory rating dimension and rating value for each rated dimension.<br><br>Rating for specific rating dimension.<br>Contains the following elements:<br>RatingDimension<br>RatingValue<br>RatingValueString | |
| RatingDimension | E3 | NM/TM | 0..1 | Rating dimension index for which the rating value is specified. Code number for the dimension, corresponding to the rating_dimension field in the ATSC Content Advisory Descriptor [2]. In any RRTParentalGuidance element, different Dimension sub-elements shall have different values of the RatingDimension. | unsignedByte |
| RatingValue | E3 | NM/TM | 1 | Rating value for the rating dimension specified in the associated RatingDimension element.<br>Code number for the rating level for the dimension, corresponding to the rating_value field in the ATSC Content Advisory Descriptor [2]. | unsignedByte |
| RatingValueString | E3 | NM/TM | 1 | Rating value text string for the rating dimension specified in the associated RatingDimension element. | string |
| RatingDescriptionText | E2 | NM/TM | 1 | Rating description text which represents the rating suitable for on-screen display.<br><br>Contains the following attribute:<br>xml:lang | string |
| xml:lang | A | NM/TM | 0..1 | The language of the RatingDescription expressed with XML attribute 'xml:lang' | string |

Content Advisory Ratings in Service Announcement

FIG. 27

| Name | Type | Category | Cardinality | Description | Data Type |
|---|---|---|---|---|---|
| RRTParentalGuidanceType | E1 | NM/TM | 0..N | Content advisory rating - one for each rating region.<br><br>Type definition for specifying a parental guidance rating that conforms to the structure of a single instance of the rating_region loop in the ATSC Content Advisory Descriptor [2]. In any element of RRTParentalGuidanceType type, the ratingRegion value shall match the ratingRegion value of a Rating Region Table approved by a standards or regulatory body applicable to the region of interest, and each ratingDimension of the instance match a ratingDimension that appears in that Rating Region Table, and the ratingValue associated with a ratingDimension in the instance match a ratingValue for the corresponding dimension in that Rating Region Table<br><br>Contains the following elements:<br>Dimension<br>RatingDescriptionText<br><br>Contains the following attribute:<br>ratingRegion | |
| ratingRegion | A | NM/TM | 0..1 | Specifies the rating region for which the following rating description, rated dimensions, rating dimension, and rating value data is specified. If not present the value of ratingRegion is inferred to be 0.<br><br>Code number for the rating region to which this parental guidance rating applies, corresponding to the rating_region field in the ATSC Content Advisory Descriptor [2]. | unsignedByte |
| Dimension | E2 | NM/TM | 1..N | Content advisory rating dimension and rating value for each rated dimension.<br><br>Rating for specific rating dimension.<br>Contains the following elements:<br>RatingDimension<br>RatingValue | |
| RatingDimension | E3 | NM/TM | 0..1 | Rating dimension index for which the rating value is specified.<br><br>Code number for the dimension, corresponding to the rating_dimension field in the ATSC Content Advisory Descriptor [2]. In any RRTParentalGuidance element, different Dimension sub-elements shall have different values of the ratingDimension attribute. | unsignedByte |
| RatingValue | E3 | NM/TM | 1 | Rating value for the rating dimension specified in the associated RatingDimension element.<br><br>Code number for the rating level for the dimension, corresponding to the rating_value field in the ATSC Content Advisory Descriptor [2]. | unsignedByte |
| RatingValueString | E3 | NM/TM | 1 | Rating value text string for the rating dimension specified in the associated RatingDimension element. | string |
| RatingDescriptionText | E2 | NM/TM | 1 | Rating description text which represents the rating suitable for on-screen display.<br><br>Text description of the overall rating.<br><br>Contains the following attribute:<br>xml:lang | string |
| xml:lang | A | NM/TM | 0..1 | The language of the RatingDescription expressed with XML attribute 'xml:lang' | string |

Content Advisory Ratings in Service Announcement

FIG. 28

Content Advisory Ratings Information Struture

Content Advisory Ratings Information Struture

```xml
<?xml version="1.0" encoding="UTF-8"?>
<xs:schema xmlns:xs="http://www.w3.org/2001/XMLSchema">
    <xs:import namespace="http://www.w3.org/XML/1998/namespace"
        schemaLocation="http://www.w3.org/2001/xml.xsd"/>
    <xs:element name="ContentAdvisoryRatings" type="CARatingType"/>
    <xs:complexType name="CARatingType">
        <xs:sequence>
            <xs:element name="RegionIdentifier" type="xs:unsignedByte"
            minOccurs="0" maxOccurs="1"/>
            <xs:element name="RatingDescription" maxOccurs="1">
                <xs:complexType>
                    <xs:simpleContent>
                        <xs:extension base="xs:string">
                            <xs:attribute ref="xml:lang" use="optional"
                            default="en"/>
                        </xs:extension>
                    </xs:simpleContent>
                </xs:complexType>
            </xs:element>
            <xs:element name="RatedDimensions" type="xs:unsignedByte"
            minOccurs="0" maxOccurs="1"/>
            <xs:element name="RatingDimVal" type="RatingDimValType"
            minOccurs="1" maxOccurs="unbounded"/>
        </xs:sequence>
    </xs:complexType>

<xs:complexType name="RatingDimValType">
        <xs:sequence>
            <xs:element name="RatingDimension" type="xs:unsignedByte"
            minOccurs="0" maxOccurs="1"/>
            <xs:choice>

<xs:element name="RatingValue" type="xs:unsignedByte"
                minOccurs="1"/>
                <xs:element name="RatingValueString" type="xs:string"
                minOccurs="1"/>
            </xs:choice>

</xs:sequence>
    </xs:complexType>
</xs:schema>
```

XML schema for content advisory ratings information

FIG. 31

```xml
<?xml version="1.0" encoding="UTF-8"?>
<schema xmlns="http://www.w3.org/2001/XMLSchema">
    <import namespace="http://www.w3.org/XML/1998/namespace"
        schemaLocation="http://www.w3.org/2001/xml.xsd"/>
    <complexType name="RRTParentalGuidanceType">
        <sequence>
            <element name="Dimension" maxOccurs="unbounded">
                <complexType>
                    <sequence>
                        <element name="RatingDimension"
                            type="unsignedByte"
                            minOccurs="0" maxOccurs="1"/>
                        <choice>
                            <element name="RatingValue">
                                <simpleType>
                                    <restriction base="unsignedByte">
                                        <maxInclusive value="15"></maxInclusive>
                                    </restriction>
                                </simpleType>
                            </element>
                            <element name="RatingValueString">
                                <simpleType>
                                    <restriction base="string">
                                        <length value="16" />
                                    </restriction>
                                </simpleType>
                            </element>
                        </choice>
                    </sequence>
                </complexType>
            </element>
            <element name="RatingDescriptionText" maxOccurs="1">
                <complexType><simpleContent>
                    <restriction base="string">
                        <length value="16" />
                    </restriction>
                    <extension base="string">
                        <attribute ref="xml:lang" use="optional" default="en"/>
                    </extension>
                </simpleContent></complexType>
            </element>
        </sequence>
        <attribute name="ratingRegion" type="unsignedByte" />
    </complexType>
</schema>
```

XML schema for content advisory ratings information

FIG. 32

Content Advisory Ratings in Service Announcement inside a Service fragment

| Name | Type | Category | Card-inality | Description | Data Type |
|---|---|---|---|---|---|
| Service | E | | | 'Service' fragment ... | |
| ... | | | | | |
| PrivateExt | E1 | NO/TM | 0..1 | An element serving as a container for proprietary or application-specific extensions. | |
| ContentAdvisoryRatings | E2 | NM/TM | 0..N | Elements, sub-elements and attributes for ContentAdvisoryRatings. | |

FIG. 33

Content Advisory Ratings in Service Announcement inside a Content fragment

| Name | Type | Category | Card-inality | Description | Data Type |
|---|---|---|---|---|---|
| Content | E | | | 'Content' fragment ... | |
| ... | | | | | |
| PrivateExt | E1 | NO/TM | 0..1 | An element serving as a container for proprietary or application-specific extensions. | |
| ContentAdvisoryRatings | E2 | NM/TM | 0..N | Elements, sub-elements and attributes for ContentAdvisoryRatings. | |

FIG. 34

RatingRegionTables Element Structure

| Element or Attribute | Use | Data Type | Description |
|---|---|---|---|
| RatingRegionTables | 1 | | |
| RatingRegionTable | 1..2 | | One or two Rating Region Tables. |
| RegionIdentifier | 1 | | Information about the region |
| @regionIdentifier | 1 | unsignedByte | Identifies the rating region described. |
| RegionIdText | 1..N | TextType | Human-readable string describing the rating region, e.g. "Canada." |
| Dimension | 1..N | | One or more elements, each describing one rating dimension in the rating region |
| @dimensionLevels | 1 | unsignedByte | The number of levels for content advisory in this dimension. Shall not be zero. |
| DimensionTitle | 0..N | TextType | Human-readable string describing the dimension. |
| @dimensionGraduated | 0..1 | boolean | If the dimension describes ratings in a graduated scale, the value of dimensionGraduated shall be TRUE, otherwise the value of dimensionGraduated shall be FALSE. Default value (if not present) shall be FALSE. When ratings are defined to be on a graduated scale, higher rating values represent increasing levels of rated content within the dimension. |
| Rating | 1..N | | Definition of each rating in the Dimension |
| @ratingValue | 1 | unsignedByte | The rating level value in integer form |
| RatingValueAbbrev | 1..N | TextType | Abbreviated human-readable string describing the rating value. |
| RatingValueString | 1..N | TextType | Human-readable string describing the rating value. |

FIG. 35

TextType Element Structure

| Element or Attribute | Use | Data Type | Description |
|---|---|---|---|
| TextType | 1 | string | |
| @lang | 0..1 | lang | The language of the string specified. |

FIG. 36

Service Level Private Extensions

| Name | Type | Category | Cardinality | Description | Data Type |
|---|---|---|---|---|---|
| ATSC3ServiceExtension | E1 | NM/TM | 1 | Additional information about ATSC 3.0 service. Contains the following elements: Icon MajorChannelNum MinorChannelNum RatingRegionTables | |
| Icon | E2 | NM/TM | 0..N | URL pointing to icon used to represent the service in ESG. Multiple URLs could be used to point to icons of different width and height or different representation formats. | anyURI |
| MajorChannelNum | E2 | NM/TM | 0..1 | Major channel number of the service. The language is expressed using built-in XML attribute 'xml:lang' with this element. | String |
| MinorChannelNum | E2 | NM/TM | 0..1 | Minor channel number of the service. The language is expressed using built-in XML attribute 'xml:lang' with this element. | String |
| RatingRegionTables | E2 | NM/TM | 0..1 | Rating Region Table. Syntax of RatingRegionTables shall be as specified in Annex F of A/331. The contents of this element in the service announcement shall match those sent in the service signaling. | |

FIG. 37

Non RRT Content Advisory Rating Information

| Name | Type | Category | Cardinality | Description | Data Type |
|---|---|---|---|---|---|
| OtherRatings | E1 | NM/TM | 0..N | Content advisory rating – not corresponding to defined Rating Region Table (RRT). Contains the following attributes: @ratingScheme @ratingInformation | |
| @ratingScheme | A | NM/TM | 1 | Specifies the scheme URI for the rating described by @tatingInformation attribute | anyURI |
| @ratingInformation | A | NM/TM | 1 | Rating information corresponding to the rating scheme defined by @ratingScheme. The interpretation of this element is specified by appropriate regional authorities. | string |

FIG. 38

```
<xs:element name="OtherRatings" >
    <xs:complexType>
        <xs:attribute name="ratingScheme" type="xs:anyURI" use="required"/>
        <xs:attribute name="ratingInformation" type="xs:string"/>
    </xs:complexType>
</xs:element>
```

FIG. 39

```
<xs:element name="OtherRatings" type="sa:OtherRatingType"/>
    <xs:complexType name="OtherRatingType">
        <xs:attribute name="ratingScheme" type="xs:anyURI" use="required"/>
        <xs:attribute name="ratingInformation" type="xs:string"/>
    </xs:complexType>
```

FIG. 40

Non RRT Content Advisory Rating Information

| Name | Type | Category | Cardinality | Description | Data Type |
|---|---|---|---|---|---|
| OtherRatings | E1 | NM/TM | 0..N | Content advisory rating – not corresponding to defined RRT. Contains the following attribute: @ratingScheme Contains one of the following elements (inside XML schema choice element): RatingInformationString RatingInformationData | |
| @ratingScheme | A | NM/TM | 1 | Specifies the scheme URI for the rating described by RatingInformationString/ RatingInformationData elements | anyURI |
| RatingInformationString | E2 | NM/TM | 0..1 | Rating information value string corresponding to the rating scheme defined by @ratingScheme. The interpretation of this element is specified by appropriate regional authorities. | String |
| RatingInformationData | E2 | NM/TM | 0..1 | Container element for rating information value data corresponding to the rating scheme defined by @ratingScheme. The interpretation of the child element(s) of this element is specified by appropriate regional authorities. Contains xs:any element(s). | |

FIG. 41

Non RRT Content Advisory Rating Information

| Name | Type | Category | Cardinality | Description | Data Type |
|---|---|---|---|---|---|
| OtherRatings | E1 | NM/TM | 0..N | Content advisory rating -- not corresponding to defined RRT. Contains the following element: RatingInformation Contains the following attribute: @ratingScheme | |
| @ratingScheme | A | NM/TM | 1 | Specifies the scheme URI for the rating described by RatingInformation element | anyURI |
| RatingInformation | E2 | NM/TM | 1 | Rating information corresponding to the rating scheme defined by @ratingScheme. The interpretation of this element is specified by appropriate regional authorities. Contains one of the following elements (as XML schema choice element): RatingInformationString RatingInformationData | |
| RatingInformationString | E3 | NM/TM | 0..1 | Rating information value string corresponding to the rating scheme defined by @ratingScheme. The interpretation of this element is specified by appropriate regional authorities. | String |
| RatingInformationData | E3 | NM/TM | 0..1 | Container element for rating information value data corresponding to the rating scheme defined by @ratingScheme. The interpretation of the child element(s) of this element is specified by appropriate regional authorities. Contains xs:any element(s). | |

FIG. 42

| Service Fragment |
|---|
| Service |
|    id |
|    version |
|    validFrom |
|    validTo |
|    globalServiceID |
|    weight |
|    emergency |
|    ServiceType |
|    Name |
|    Description |
|    AudioLanguage |
|       languageSDPTag |
|    TextLanguage |
|       languageSDPTag |
|    ContentAdvisoryRatings |
|    OtherRatings |
|    TargetUserProfile |
|    Genre |
|    BroadcastArea |
|    PrivateExt |
|       ATSC3ServicePrivateExt |
|          Icon |
|          MajorChannelNum |
|          MinorChannelNum |
|          RatingRegionRables |

FIG. 43

| Content Fragment |
|---|
| Content |
|     id |
|     version |
|     validFrom |
|     validTo |
|     globalContentID |
|     baseCID |
|     ServiceReference |
|         idRef |
|         weight |
|     Name |
|     Description |
|     AudioLanguage |
|         languageSDPTag |
|     TextLanguage |
|         languageSDPTag |
|     Length |
|     ContentAdvisoryRatings |
|     OtherRatings |
|     TargetUserProfile |
|     Genre |
|     BroadcastArea |
|     TermsOfUse |
|     Popularity |
|         rating |
|         noOfViews |
|         noOfDiscussions |
|         samplingDate |
|     Freshness |
|         releastDate |
|         broadcastDate |
|     PrivateExt |
|         Components |
|             AudioComponent |
|                 language |
|             VideoComponent |
|                 language |
|             CCComponent |
|                 language |
|             AppComponent |
|                 Language |
|         Capabilities |

FIG. 44

```xml
<?xml version="1.0" encoding="UTF-8"?>
  <xs:schema xmlns:xs="http://www.w3.org/2001/XMLSchema"
      xmlns:rrt="http://www.atsc.org/XMLSchemas/ATSC3/Delivery/RRT/1.0/"
      targetNamespace="http://www.atsc.org/XMLSchemas/ATSC3/Delivery/RRT/1.0/"
      elementFormDefault="qualified">
    <xs:import namespace="http://www.w3.org/XML/1998/namespace"
      schemaLocation="http://www.w3.org/2001/xml.xsd"/>
    <xs:element name="RatingRegionTables" type="rrt:RRsType"/>
    <xs:complexType name="RRsType">
      <xs:sequence>
        <xs:element name="RatingRegionTable" type="rrt:RatingRegionTableType" minOccurs="1" maxOccurs="2"/>
      </xs:sequence>
    </xs:complexType>

<xs:complexType name="RatingRegionTableType">
      <xs:sequence>
        <xs:element name="RegionIdentifier" type="rrt:RegionIdentifierType" minOccurs="1" maxOccurs="1"/>
        <xs:element name="RegionIdText" type="rrt:TextType" minOccurs="1" maxOccurs="unbounded"/>
        <xs:element name="Dimension" type="rrt:DimensionType" minOccurs="1" maxOccurs="unbounded"/>
      </xs:sequence>
    </xs:complexType>
    <xs:complexType name="RegionIdentifierType">
      <xs:attribute name="regionIdentifier" type="rrt:RIType"/>
    </xs:complexType>
    <xs:simpleType name="RIType">
      <xs:restriction base="xs:unsignedByte">
        <xs:minInclusive value="1"/>
      </xs:restriction>
    </xs:simpleType>
    <xs:complexType name="DimensionType">
      <xs:sequence>
        <xs:element name="DimensionTitle" type="rrt:TextType" minOccurs="0" maxOccurs="unbounded"/>
        <xs:element name="Rating" type="rrt:RatingType" minOccurs="1" maxOccurs="unbounded"/>
      </xs:sequence>
      <xs:attribute name="dimensionLevels" type="rrt:DimLevelType" use="required"/>
      <xs:attribute name="dimensionsGraduated" type="xs:boolean" use="optional" default="false"/>
```

FIG. 45A

```
    </xs:complexType>
    <xs:simpleType name="DimLevelType">
        <xs:restriction base="xs:unsignedByte">
            <xs:minInclusive value="1"/>
        </xs:restriction>
    </xs:simpleType>
    <xs:complexType name="RatingType">
        <xs:sequence>
            <xs:element name="RatingValueAbbrev" type="rrt:TextType" minOccurs="1" maxOccurs="unbounded"/>
            <xs:element name="RatingValueString" type="rrt:TextType" minOccurs="1" maxOccurs="unbounded"/>
        </xs:sequence>
        <xs:attribute name="ratingValue" type="xs:unsignedByte" use="required"/>
    </xs:complexType>
    <xs:complexType name="TextType">
        <xs:simpleContent>
            <xs:extension base="xs:string">
                <xs:attribute name="lang" type="xs:language" use="optional" default="EN"/>
            </xs:extension>
        </xs:simpleContent>
    </xs:complexType>
</xs:schema>
```

FIG. 45B

RATINGS INFORMATION

TECHNICAL FIELD

The present disclosure relates generally to a service guide.

BACKGROUND ART

A broadcast service is capable of being received by all users having broadcast receivers. Broadcast services can be roughly divided into two categories, namely, a radio broadcast service carrying only audio and a multimedia broadcast service carrying audio, video and data. Such broadcast services have developed from analog services to digital services. More recently, various types of broadcasting systems (such as a cable broadcasting system, a satellite broadcasting system, an Internet based broadcasting system, and a hybrid broadcasting system using both a cable network, Internet, and/or a satellite) provide high quality audio and video broadcast services along with a high-speed data service. Also, broadcast services include sending and/or receiving audio, video, and/or data directed to an individual computer and/or group of computers and/or one or more mobile communication devices.

In addition to more traditional stationary receiving devices, mobile communication devices are likewise configured to support such services. Such configured mobile devices have facilitated users to use such services while on the move, such as mobile phones. An increasing need for multimedia services has resulted in various wireless/broadcast services for both mobile communications and general wire communications. Further, this convergence has merged the environment for different wire and wireless broadcast services.

Open Mobile Alliance (OMA), is a standard for interworking between individual mobile solutions, serves to define various application standards for mobile software and Internet services. OMA Mobile Broadcast Services Enabler Suite (OMA BCAST) is a specification designed to support mobile broadcast technologies. The OMA BCAST defines technologies that provide IP-based mobile content delivery, which includes a variety of functions such as a service guide, downloading and streaming, service and content protection, service subscription, and roaming.

The foregoing and other objectives, features, and advantages of the invention will be more readily understood upon consideration of the following detailed description of the invention, taken in conjunction with the accompanying drawings.

SUMMARY OF INVENTION

One embodiment of the present invention discloses a method for decoding a service fragment associated with a program included within a video bitstream comprising the steps of: (a) receiving a service within said service fragment; (b) receiving a content advisory ratings element corresponding to a rating region table of content advisory rating information within said service; (c) receiving an other ratings element not corresponding to a rating region table of content advisory rating information within said service; (d) receiving a rating scheme attribute corresponding to said other ratings element that specifies a scheme uniform resource identifier for only one selected between (i) a rating information string element corresponding to a rating scheme defined by said rating scheme attribute and (ii) a rating information data element for rating information value data corresponding to said rating scheme attribute within said service; (e) receiving said selected one of (i) said rating information string element corresponding to said rating scheme attribute defined by said rating scheme and (ii) said rating information data element for rating information value data corresponding to said rating scheme attribute within said service; (f) decoding said service fragment.

BRIEF DESCRIPTION OF DRAWINGS

FIG. 5 illustrates content advisory ratings in a service announcement.

FIG. 7B illustrates a region identifier.

FIG. 7C illustrates a rating dimension.

FIG. 8 illustrates an XML schema for content advisory ratings.

FIG. 9A illustrates portion of an alternative XML schema for content advisory ratings.

FIG. 9B illustrates portion of an alternative XML schema for content advisory ratings.

FIG. 10A illustrates content advisory ratings in a service announcement.

FIG. 10B illustrates content advisory ratings in a service announcement.

FIG. 11 illustrates Binary/Stream Syntax for Content Advisory Ratings Description.

FIG. 12 illustrates Content Advisory Ratings in Service Announcement inside a Service fragment.

FIG. 13 illustrates Content Advisory Ratings in Service Announcement inside a Service fragment.

FIG. 14 illustrates Content Advisory Ratings in Service Announcement inside a Service fragment.

FIG. 15 illustrates Content Advisory Ratings in Service Announcement inside a Content fragment.

FIG. 16 illustrates Content Advisory Ratings in Service Announcement inside a Content fragment.

FIG. 17 illustrates Content Advisory Ratings in Service Announcement inside a Content fragment.

FIG. 18A illustrates Content Advisory Ratings in Service Announcement inside each component Content fragment.

FIG. 18B illustrates Content Advisory Ratings in Service Announcement inside each component Content fragment.

FIG. 18C illustrates Content Advisory Ratings in Service Announcement inside each component Content fragment.

FIG. 19 illustrates Content Advisory Ratings element inside each component Content fragment.

FIG. 20 illustrates Content Advisory Ratings element inside each component Content fragment.

FIG. 21 illustrates Content Advisory Ratings element inside each component Content fragment.

FIG. 22A illustrates a content advisory ratings information structure.

FIG. 22B illustrates a content advisory ratings information structure.

FIG. 23A illustrates an XML schema for content advisory ratings information.

FIG. 23B illustrates an XML schema for content advisory ratings information.

FIG. 24 illustrates content advisory ratings in a service announcement.

FIG. 25 illustrates part of content advisory ratings in a service announcement.

FIG. 26 illustrates part of content advisory ratings in a service announcement.

FIG. 27 illustrates content advisory ratings in a service announcement.

FIG. 28 illustrates content advisory ratings in a service announcement.

FIG. 31 illustrates an XML schema for content advisory ratings information.

FIG. 32 illustrates an XML schema for content advisory ratings information.

FIG. 33 illustrates a schema for content advisory ratings in service announcement inside a service fragment.

FIG. 34 illustrates a schema for content advisory ratings in service announcement inside a content fragment.

FIG. 35 illustrates a Rating Region Tables Element Structure.

FIG. 36 illustrates a TextType Element Structure.

FIG. 37 illustrates a schema for service level private extensions.

FIG. 38 illustrates a schema for non-RRT content advisory rating information.

FIG. 39 illustrates an XML schema for OtherRatings element.

FIG. 40 illustrates another XML schema for OtherRatings element.

FIG. 41 illustrates a schema for non-RRT content advisory rating information.

FIG. 42 illustrates another schema for non-RRT content advisory rating information.

FIG. 43 illustrates an exemplary service fragment.

FIG. 44 illustrates an exemplary content fragment.

FIG. 45A illustrates and exemplary Rating Region Table XML schema.

FIG. 45B illustrates and exemplary Rating Region Table XML schema.

DESCRIPTION OF EMBODIMENTS

Figure 1:
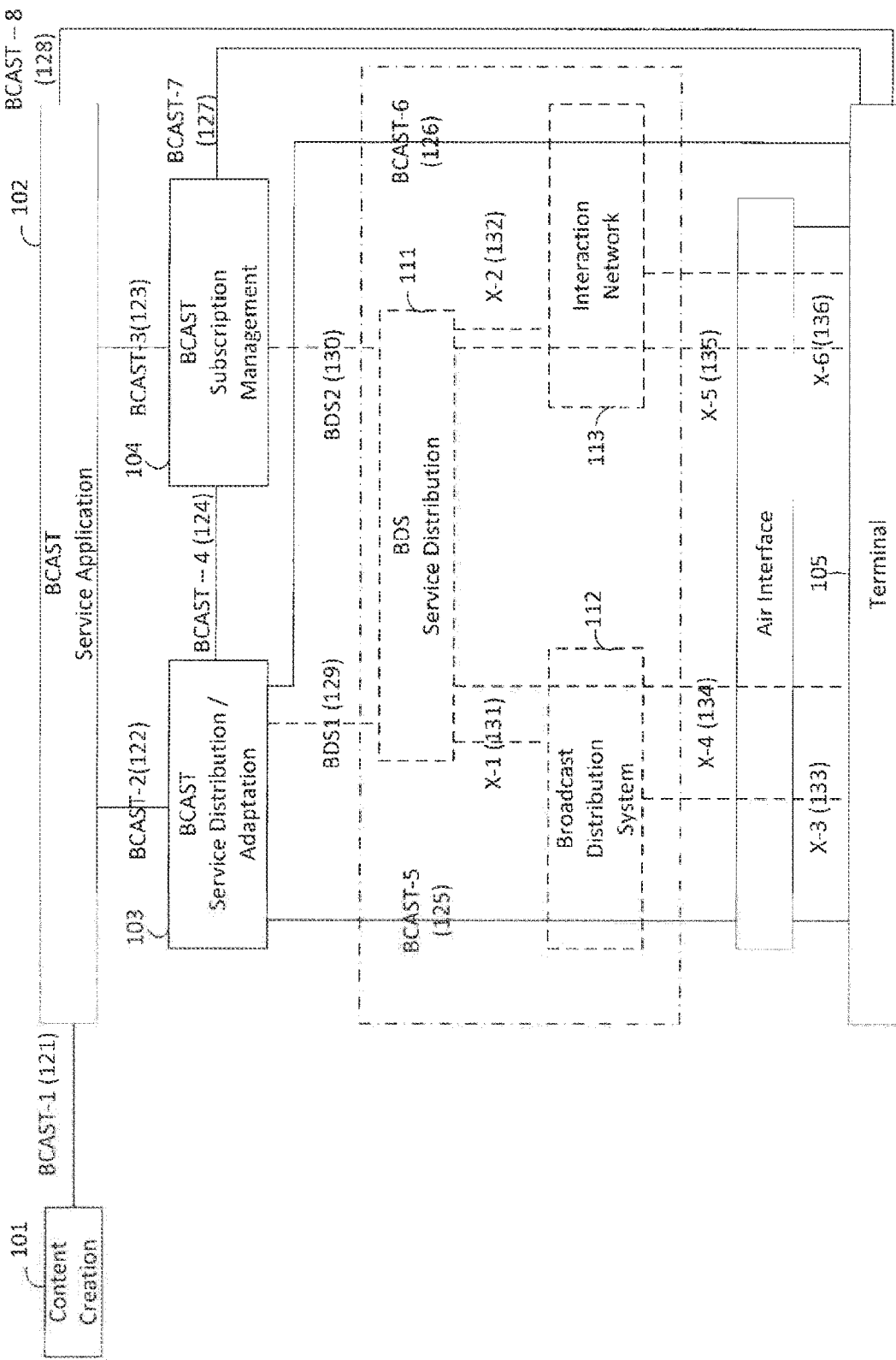
FIG. 1 is a block diagram illustrating logical architecture of a BCAST system specified by OMA BCAST working group in an application layer and a transport layer.

Referring to FIG. 1, a logical architecture of a broadcast system specified by OMA (Open Mobile Alliance) BCAST may include an application layer and a transport layer. The logical architecture of the BCAST system may include a Content Creation (CC) 101, a BCAST Service Application 102, a BCAST Service Distribution/Adaptation (BSDA) 103, a BCAST Subscription Management (BSM) 104, a Terminal 105, a Broadcast Distribution System (BDS) Service Distribution 111, a BDS 112, and an Interaction Network 113. It is to be understood that the broadcast system and/or receiver system may be reconfigured, as desired. It is to be understood that the broadcast system and/or receiver system may include additional elements and/or fewer elements, as desired.

In general, the Content Creation (CC) 101 may provide content that is the basis of BCAST services. The content may include files for common broadcast services, e.g., data for a movie including audio and video. The Content Creation 101 provides a BCAST Service Application 102 with attributes for the content, which are used to create a service guide and to determine a transmission bearer over which the services will be delivered.

In general, the BCAST Service Application 102 may receive data for BCAST services provided from the Content Creation 101, and converts the received data into a form suitable for providing media encoding, content protection, interactive services, etc. The BCAST Service Application 102 provides the attributes for the content, which is received from the Content Creation 101, to the BSDA 103 and the BSM 104.

In general, the BSDA 103 may perform operations, such as file/streaming delivery, service gathering, service protection, service guide creation/delivery and service notification, using the BCAST service data provided from the BCAST Service Application 102. The BSDA 103 adapts the services to the BDS 112.

In general, the BSM 104 may manage, via hardware or software, service provisioning, such as subscription and charging-related functions for BCAST service users, information provisioning used for BCAST services, and mobile terminals that receive the BCAST services.

In general, the Terminal 105 may receive content/service guide and program support information, such as content protection, and provides a broadcast service to a user. The BDS Service Distribution 111 delivers mobile broadcast services to a plurality of terminals through mutual communication with the BDS 112 and the Interaction Network 113.

In general, the BDS 112 may deliver mobile broadcast services over a broadcast channel, and may include, for example, a Multimedia Broadcast Multicast Service (MBMS) by 3rd Generation Project Partnership (3GPP), a Broadcast Multicast Service (BCMCS) by 3rd Generation Project Partnership 2 (3GPP2), a DVB-Handheld (DVB-H) by Digital Video Broadcasting (DVB), or an Internet Protocol (IP) based broadcasting communication network. The Interaction Network 113 provides an interaction channel, and may include, for example, a cellular network.

The reference points, or connection paths between the logical entities of FIG. 1, may have a plurality of interfaces, as desired. The interfaces are used for communication between two or more logical entities for their specific purposes. A message format, a protocol and the like are applied for the interfaces. In some embodiments, there are no logical interfaces between one or more different functions.

BCAST-1 121 is a transmission path for content and content attributes, and BCAST-2 122 is a transmission path for a content-protected or content-unprotected BCAST service, attributes of the BCAST service, and content attributes.

BCAST-3 123 is a transmission path for attributes of a BCAST service, attributes of content, user preference/subscription information, a user request, and a response to the request. BCAST-4 124 is a transmission path for a notification message, attributes used for a service guide, and a key used for content protection and service protection.

BCAST-5 125 is a transmission path for a protected BCAST service, an unprotected BCAST service, a content-protected BCAST service, a content-unprotected BCAST service, BCAST service attributes, content attributes, a notification, a service guide, security materials such as a Digital Right Management (DRM) Right Object (RO) and key values used for BCAST service protection, and all data and signaling transmitted through a broadcast channel.

BCAST-6 126 is a transmission path for a protected BCAST service, an unprotected BCAST service, a content-protected BCAST service, a content-unprotected BCAST service, BCAST service attributes, content attributes, a notification, a service guide, security materials such as a DRM RO and key values used for BCAST service protection, and all data and signaling transmitted through an interaction channel.

BCAST-7 127 is a transmission path for service provisioning, subscription information, device management, and user preference information transmitted through an interaction channel for control information related to receipt of security materials, such as a DRM RO and key values used for BCAST service protection.

BCAST-8 128 is a transmission path through which user data for a BCAST service is provided. BDS-1 129 is a transmission path for a protected BCAST service, an unprotected BCAST service, BCAST service attributes, content attributes, a notification, a service guide, and security materials, such as a DRM RO and key values used for BCAST service protection.

BDS-2 130 is a transmission path for service provisioning, subscription information, device management, and security materials, such as a DRM RO and key values used for BCAST service protection.

X-1 131 is a reference point between the BDS Service Distribution 111 and the BDS 112. X-2 132 is a reference point between the BDS Service Distribution 111 and the Interaction Network 113. X-3 133 is a reference point between the BDS 112 and the Terminal 105. X-4 134 is a reference point between the BDS Service Distribution 111 and the Terminal 105 over a broadcast channel. X-5 135 is a reference point between the BDS Service Distribution 111 and the Terminal 105 over an interaction channel. X-6 136 is a reference point between the Interaction Network 113 and the Terminal 105.

Figure 2:
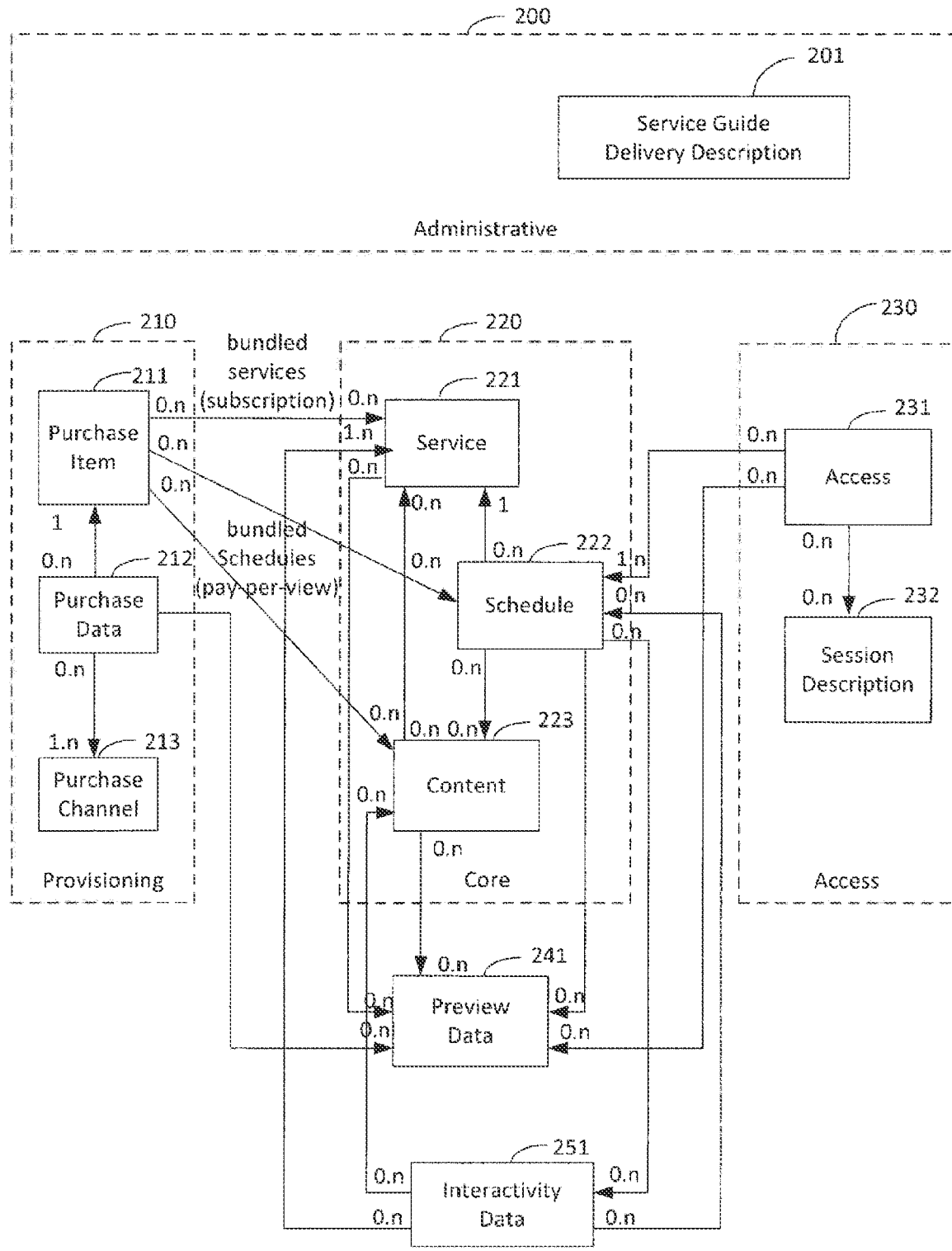
FIG. 2 is a diagram illustrating a structure of a service guide for use in the OMA BCAST system.

Referring to FIG. 2, an exemplary service guide for the OMA BCAST system is illustrated. For purposes of illustration, the solid arrows between fragments indicate the reference directions between the fragments. It is to be understood that the service guide system may be reconfigured, as desired. It is to be understood that the service guide system may include additional elements and/or fewer elements, as desired. It is to be understood that functionality of the elements may be modified and/or combined, as desired.

Figure 2A:
FIG. 2A is a diagram showing cardinalities and reference direction between service guide fragments.

FIG. 2A is a diagram showing cardinalities and reference direction between service guide fragments. The meaning of the cardinalities shown in the FIG. 2 is the following: One instantiation of Fragment A as in FIG. 2A references c to d instantiations of Fragment B. If c=d, d is omitted. Thus, if c>0 and Fragment A exists, at least c instantiation of Fragment B may also exist, but at most d instantiations of Fragment B may exist. Vice versa, one instantiation of Fragment B is referenced by a to b instantiations of Fragment A. If a=b, b is omitted. The arrow connection from Fragment A pointing to Fragment B indicates that Fragment A contains the reference to Fragment B.

With respect to FIG. 2, in general, the service guide may include an Administrative Group 200 for providing basic information about the entire service guide, a Provisioning Group 210 for providing subscription and purchase information, a Core Group 220 that acts as a core part of the service guide, and an Access Group 230 for providing access information that control access to services and content.

The Administrative Group 200 may include a Service Guide Delivery Descriptor (SGDD) block 201. The Provision Group 210 may include a Purchase Item block 211, a Purchase Data block 212, and a Purchase Channel block 213. The Core Group 220 may include a Service block 221, a Schedule block 222, and a Content block 223. The Access Group 230 may include an Access block 231 and a Session Description block 232.

The service guide may further include Preview Data 241 and Interactivity Data 251 in addition to the four information groups 200, 210, 220, and 230.

The aforementioned components may be referred to as basic units or fragments constituting aspects of the service guide, for purposes of identification.

The SGDD fragment 201 may provide information about a delivery session where a Service Guide Delivery Unit (SGDU) is located. The SGDU is a container that contains service guide fragments 211, 212, 213, 221, 222, 223, 231, 232, 241, and 251, which constitute the service guide. The SGDD may also provide the information on the entry points for receiving the grouping information and notification messages.

The Service fragment 221, which is an upper aggregate of the content included in the broadcast service, may include information on service content, genre, service location, etc. In general, the 'Service' fragment describes at an aggregate level the content items which comprise a broadcast service. The service may be delivered to the user using multiple means of access, for example, the broadcast channel and the interactive channel. The service may be targeted at a certain user group or geographical area. Depending on the type of the service it may have interactive part(s), broadcast-only part(s), or both. Further, the service may include components not directly related to the content but to the functionality of the service such as purchasing or subscription information. As the part of the Service Guide, the 'Service' fragment forms a central hub referenced by the other fragments including 'Access', 'Schedule', 'Content' and 'PurchaseItem' fragments. In addition to that, the 'Service' fragment may reference 'PreviewData' fragment. It may be referenced by none or several of each of these fragments. Together with the associated fragments the terminal may determine the details associated with the service at any point of time. These details may be summarized into a user-friendly display, for example, of what, how and when the associated content may be consumed and at what cost.

The Access fragment 231 may provide access-related information for allowing the user to view the service and delivery method, and session information associated with the corresponding access session. As such, the 'Access' fragment describes how the service may be accessed during the lifespan of the service. This fragment contains or references Session Description information and indicates the delivery method. One or more 'Access' fragments may reference a 'Service' fragment, offering alternative ways for accessing or interacting with the associated service. For the Terminal, the 'Access' fragment provides information on what capabilities are required from the terminal to receive and render the service. The 'Access' fragment provides Session Description parameters either in the form of inline text, or through a pointer in the form of a URI to a separate Session Description. Session Description information may be delivered over either the broadcast channel or the interaction channel.

The Session Description fragment 232 may be included in the Access fragment 231, and may provide location information in a Uniform Resource Identifier (URI) form so that the terminal may detect information on the Session Description fragment 232. The Session Description fragment 232 may provide address information, codec information, etc., about multimedia content existing in the session. As such, the 'SessionDescription' is a Service Guide fragment which provides the session information for access to a service or content item. Further, the Session Description may provide auxiliary description information, used for associated delivery procedures. The Session Description information is provided using either syntax of SDP in text format, or through a 3GPP MBMS User Service Bundle Description [3GPP TS 26.346] (USBD). Auxiliary description information is provided in XML format and contains an Associated Delivery Description as specified in [BCAST10-Distribution]. Note that in case SDP syntax is used, an alternative way to deliver the Session Description is by encapsulating the SDP in text format in 'Access' fragment. Note that Session Description may be used both for Service Guide delivery itself as well as for the content sessions.

The Purchase Item fragment 211 may provide a bundle of service, content, time, etc., to help the user subscribe to or purchase the Purchase Item fragment 211. As such, the 'PurchaseItem' fragment represents a group of one or more services (i.e. a service bundle) or one or more content items, offered to the end user for free, for subscription and/or purchase. This fragment can be referenced by 'PurchaseData' fragment(s) offering more information on different service bundles. The 'PurchaseItem' fragment may be also associated with: (1) a 'Service' fragment to enable bundled services subscription and/or, (2) a 'Schedule' fragment to enable consuming a certain service or content in a certain timeframe (pay-per-view functionality) and/or, (3) a 'Content' fragment to enable purchasing a single content file related to a service, (4) other 'PurchaseItem' fragments to enable bundling of purchase items.

The Purchase Data fragment 212 may include detailed purchase and subscription information, such as price information and promotion information, for the service or content bundle. The Purchase Channel fragment 213 may provide access information for subscription or purchase. As such, the main function of the 'PurchaseData' fragment is to express all the available pricing information about the associated purchase item. The 'PurchaseData' fragment collects the information about one or several purchase channels and may be associated with PreviewData specific to a certain service or service bundle. It carries information about pricing of a service, a service bundle, or, a content item. Also, information about promotional activities may be included in this fragment. The SGDD may also provide information regarding entry points for receiving the service guide and grouping information about the SGDU as the container.

The Preview Data fragment 241 may be used to provide preview information for a service, schedule, and content. As such, 'PreviewData' fragment contains information that is used by the terminal to present the service or content outline to users, so that the users can have a general idea of what the service or content is about. 'PreviewData' fragment can include simple texts, static images (for example, logo), short video clips, or even reference to another service which could be a low bit rate version for the main service. 'Service', 'Content', 'PurchaseData', 'Access' and 'Schedule' fragments may reference 'PreviewData' fragment.

The Interactivity Data fragment 251 may be used to provide an interactive service according to the service, schedule, and content during broadcasting. More detailed information about the service guide can be defined by one or more elements and attributes of the system. As such, the InteractivityData contains information that is used by the terminal to offer interactive services to the user, which is associated with the broadcast content. These interactive services enable users to e.g. vote during TV shows or to obtain content related to the broadcast content. 'Interactivity Data' fragment points to one or many 'InteractivityMedia' documents that include xhtml files, static images, email template. SMS template, MMS template documents, etc. The 'InteractivityData' fragment may reference the 'Service', 'Content' and 'Schedule' fragments, and may be referenced by the 'Schedule' fragment.

The 'Schedule' fragment defines the timeframes in which associated content items are available for streaming, downloading and/or rendering. This fragment references the 'Service' fragment. If it also references one or more 'Content' fragments or 'InteractivityData' fragments, then it defines the valid distribution and/or presentation timeframe of those content items belonging to the service, or the valid distribution timeframe and the automatic activation time of the InteractivityMediaDocuments associated with the service. On the other hand, if the 'Schedule' fragment does not reference any 'Content' fragment(s) or 'InteractivityData' fragment(s), then it defines the timeframe of the service availability which is unbounded.

The 'Content' fragment gives a detailed description of a specific content item. In addition to defining a type, description and language of the content, it may provide information about the targeted user group or geographical area, as well as genre and parental rating. The 'Content' fragment may be referenced by Schedule, PurchaseItem or 'InteractivityData' fragment. It may reference 'PreviewData' fragment or 'Service' fragment.

The 'PurchaseChannel' fragment carries the information about the entity from which purchase of access and/or content rights for a certain service, service bundle or content item may be obtained, as defined in the 'PurchaseData' fragment. The purchase channel is associated with one or more Broadcast Subscription Managements (BSMs). The terminal is only permitted to access a particular purchase channel if it is affiliated with a BSM that is also associated with that purchase channel. Multiple purchase channels may be associated to one 'PurchaseData' fragment. A certain end-user can have a "preferred" purchase channel (e.g. his/her mobile operator) to which all purchase requests should be directed. The preferred purchase channel may even be the only channel that an end-user is allowed to use.

The ServiceGuideDeliveryDscriptor is transported on the Service Guide Announcement Channel. and informs the terminal the availability, metadata and grouping of the fragments of the Service Guide in the Service Guide discovery process. A SGDD allows quick identification of the Service Guide fragments that are either cached in the terminal or being transmitted. For that reason, the SGDD is preferably repeated if distributed over broadcast channel. The SGDD also provides the grouping of related Service Guide fragments and thus a means to determine completeness of such group. The ServiceGuideDeliveryDescriptor is especially useful if the terminal moves from one service coverage area to another. In this case, the ServiceGuideDeliveryDescriptor can be used to quickly check which of the Service Guide fragments that have been received in the previous service coverage area are still valid in the current service coverage area, and therefore don't have to be re-parsed and re-processed.

Although not expressly depicted, the fragments that constitute the service guide may include element and attribute values for fulfilling their purposes. In addition, one or more of the fragments of the service guide may be omitted, as desired. Also, one or more fragments of the service guide may be combined, as desired. Also, different aspects of one or more fragments of the service guide may be combined together, reorganized, and otherwise modified, or constrained as desired.

Figures 3, 4:
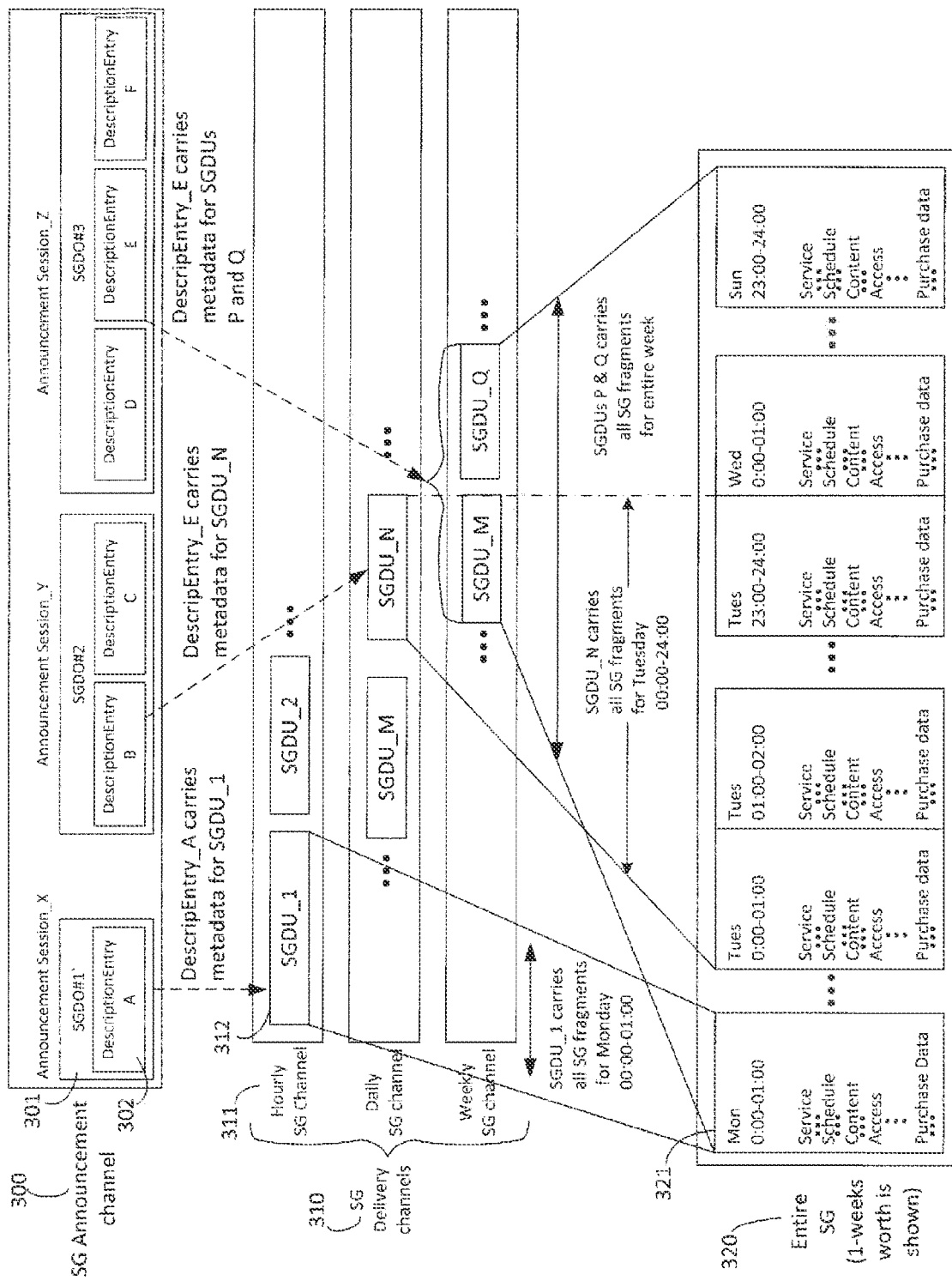
FIG. 3 is a block diagram illustrating a principle of the conventional service guide delivery method.
FIG. 4 illustrates a description scheme.

Referring to FIG. 3, an exemplary block diagram illustrates aspects of a service guide delivery technique. The Service Guide Deliver Descriptor fragment 201 may include the session information, grouping information, and notification message access information related to all fragments containing service information. When the mobile broadcast service-enabled terminal 105 turns on or begins to receive the service guide, it may access a Service Guide Announcement Channel (SG Announcement Channel) 300.

The SG Announcement Channel 300 may include at least one of SGDD 200 (e.g., SGDD #1 . . . , SGDD #2, SGDD #3), which may be formatted in any suitable format, such as that illustrated in Service Guide for Mobile Broadcast Services, Open Mobile Alliance, Version 1.0.1, Jan. 9, 2013 and/or Service Guide for Mobile Broadcast Services, open Mobile Alliance, Version 1.1, Oct. 29, 3013; both of which are incorporated by reference in their entirety. The descriptions of elements and attributes constituting the Service Guide Delivery Descriptor fragment 201 may be reflected in any suitable format, such as for example, a table format and/or in an eXtensible Markup Language (XML) schema.

The actual data is preferably provided in XML format according to the SGDD fragment 201. The information related to the service guide may be provided in various data formats, such as binary, where the elements and attributes are set to corresponding values, depending on the broadcast system.

The terminal 105 may acquire transport information about a Service Guide Delivery Unit (SGDU) 312 containing fragment information from a DescriptorEntry of the SGDD fragment received on the SG Announcement Channel 300.

The DescriptorEntry 302, which may provide the grouping information of a Service Guide includes the "GroupingCriteria", "ServiceGuideDeliveryUnit", "Transport", and AlternativeAccessURI". The transport-related channel information may be provided by the "Transport" or "AlternativeAccessURI", and the actual value of the corresponding channel is provided by "ServiceGuideDeliveryUnit". Also, upper layer group information about the SGDU 312, such as "Service" and "Genre", may be provided by "GroupingCriteria". The terminal 105 may receive and present all of the SGDUs 312 to the user according to the corresponding group information.

Once the transport information is acquired, the terminal 105 may access all of the Delivery Channels acquired from a DescriptorEntry 302 in an SGDD 301 on an SG Delivery Channel 310 to receive the actual SGDU 312. The SG Delivery Channels can be identified using the "GroupingCriteria". I the case of time grouping, the SGDU can be transported with a time-based transport channel such as an Hourly SG Channel 311 and a Daily SG Channel. Accordingly, the terminal 105 can selectively access the channels and receive all the SGDUs existing on the corresponding channels. Once the entire SGDU is completely received on the SG Delivery Channels 310, the terminal 105 checks all the fragments contained in the SGDUs received on the SG Delivery Channels 310 and assembles the fragments to display an actual full service guide 320 on the screen which can be subdivided on an hourly basis 321.

In the conventional mobile broadcast system, the service guide is formatted and transmitted such that only configured terminals receive the broadcast signals of the corresponding broadcast system. For example, the service guide information transmitted by a DVB-H system can only be received by terminals configured to receive the DVB-H broadcast.

The service providers provide bundled and integrated services using various transmission systems as well as various broadcast systems in accordance with service convergence, which may be referred to as multiplay services. The broadcast service providers may also provide broadcast services on IP networks. Integrated service guide transmission/reception systems may be described using terms of entities defined in the 3GPP standards and OMA BCAST standards (e.g., a scheme). However, the service guide/reception systems may be used with any suitable communication and/or broadcast system.

Referring to FIG. 4, the scheme may include, for example, (1) Name; (2) Type; (3) Category; (4) Cardinality; (5) Description; and (6) Data type. The scheme may be arranged in any manner, such as a table format of an XML format.

The "name" column indicates the name of an element or an attribute. The "type" column indicates an index representing an element or an attribute. An element can be one of E1, E2, E3, E4, . . . , E[n]. E1 indicates an upper element of an entire message, E2 indicates an element below the E1, E3 indicates an element below E2, E4 indicates an element below the E3, and so forth. An attribute is indicated by A. For example, an "A" below E1 means an attribute of element E1. In some cases the notation may mean the following E=Element, A=Attribute, E1=sub-element, E2=sub-element's sub-element, E[n]=sub-element of element[n−1]. The "category" column is used to indicate whether the element or attribute is mandatory. If an element is mandatory, the category of the element is flagged with an "M". If an element is optional, the category of the element is flagged with an "O". If the element is optional for network to support it the element is flagged with a "NO". If the element is mandatory for terminal to support it is flagged with a TM. If the element is mandatory for network to support it the element is flagged with "NM". If the element is optional for terminal to support it the element is flagged with "TO". If an element or attribute has cardinality greater than zero, it is classified as M or NM to maintain consistency. The "cardinality" column indicates a relationship between elements and is set to a value of 0, 0 . . . 1, 1, 0 . . . n, and 1 . . . n. 0 indicates an option, 1 indicates a necessary relationship, and n indicates multiple values. For example, 0 . . . n means that a corresponding element can have no or n values. The "description" column describes the meaning of the corresponding element or attribute, and the "data type" column indicates the data type of the corresponding element or attribute.

A service may represent a bundle of content items, which forms a logical group to the end-user. An example would be a TV channel, composed of several TV shows. A 'Service' fragment contains the metadata describing the Mobile Broadcast service. It is possible that the same metadata (i.e., attributes and elements) exist in the 'Content' fragment(s) associated with that 'Service' fragment. In that situation, for the following elements: 'ParentalRating', 'TargetUserProfile', 'Genre' and 'BroadcastArea', the values defined in 'Content' fragment take precedence over those in 'Service' fragment.

The program guide elements of this fragment may be grouped between the Start of program guide and end of program guide cells in a fragment. This localization of the elements of the program guide reduces the computational complexity of the receiving device in arranging a programming guide. The program guide elements are generally used for user interpretation. This enables the content creator to provide user readable information about the service. The terminal should use all declared program guide elements in this fragment for presentation to the end-user. The terminal may offer search, sort, etc. functionalities. The Program Guide may consist of the following service elements: (1) Name; (2) Description; (3) AudioLanguage; (4) TextLanguage; (5) ParentalRating; (6) TargetUserProfile; and (7) Genre.

The "Name" element may refer to Name of the Service, possibly in multiple languages. The language may be expressed using built-in XML attribute 'xml:lang'.

The "Description" element may be in multiple languages and may be expressed using built-in XML attribute 'xml:lang'.

The "AudioLanguage" element may declare for the end users that this service is available with an audio track corresponding to the language represented by the value of this element. The textual value of this element can be made available for the end users in different languages. In such a case the language used to represent the value of this element may be signaled using the built-in XML attribute 'xml:lang', and may include multi-language support. The AudioLanguage may contain an attribute languageSDPTag.

The "languageSDPTag" attribute is an identifier of the audio language described by the parent 'AudioLanguage' element as used in the media sections describing the audio track in a Session Description. Each 'AudioLanguage' element declaring the same audio stream may have the same value of the 'languageSDPTag'.

The "TextLanguage" element may declare for the end user that the textual components of this service are available in the language represented by the value of this element. The textual components can be, for instance, a caption or a sub-title track. The textual value of this element can be made available for the end users in different languages. In such a case the language used to represent the value of this element may be signaled using the built-in XML attribute 'xml:lang', and may include multi-language support. The same rules and constraints as specified for the element 'AudioLanguage' of assigning and interpreting the attributes 'languageSDPTag' and 'xml:lang' may be applied for this element.

The "languageSDPTag" attribute is an identifier of the text language described by the parent 'TextLanguage' element as used in the media sections describing the textual track in a Session Description.

The "ParentalRating" element may declare criteria parents and might be used to determine whether the associated item is suitable for access by children, defined according to the regulatory requirements of the service area. The terminal may support 'ParentalRating' being a free string, and the terminal may support the structured way to express the parental rating level by using the 'ratingSystem' and 'ratingValueName' attributes.

The "ratingSystem" attribute may specify the parental rating system in use, in which context the value of the 'ParentalRating' element is semantically defined. This allows terminals to identify the rating system in use in a non-ambiguous manner and act appropriately. This attribute may be instantiated when a rating system is used. Absence of this attribute means that no rating system is used (i.e. the value of the 'ParentalRating' element is to be interpreted as a free string).

The "ratingValueName" attribute may specify the human-readable name of the rating value given by this ParentalRating element.

The "TargetUserProfile" may specify elements of the users whom the service is targeting at. The detailed personal attribute names and the corresponding values are specified by attributes of 'attributeName' an 'attributeValue'. Amongst the possible profile attribute names are age, gender, occupation, etc. (subject to national/local rules & regulations, if present and as applicable regarding use of personal profiling information and personal data privacy). The extensible list of 'attributeName' and 'attributeValue' pairs for a particular service enables end user profile filtering and end user preference filtering of broadcast services. The terminal may be able to support 'TargetUserProfile' element. The use of 'TargetUserProfile' element may be an "opt-in" capability for users. Terminal settings may allow users to configure whether to input their personal profile or preference and whether to allow broadcast service to be automatically filtered based on the users' personal attributes without users' request. This element may contain the following attributes: attributeName and attributeValue.

The "attributeName" attribute may be a profile attribute name.

The "attributeValue" attribute may be a profile attribute value.

The "Genre" element may specify classification of service associated with characteristic form (e.g. comedy, drama). The OMA BCAST Service Guide may allow describing the format of the Genre element in the Service Guide in two ways. The first way is to use a free string. The second way is to use the "href" attributes of the Genre element to convey the information in the form of a controlled vocabulary (classification scheme as defined in [TVA-Metadata] or classification list as defined in [MIGFG]). The built-in XML attribute xml:lang may be used with this element to express the language. The network may instantiate several different sets of 'Genre' element, using it as a free string or with a 'href' attribute. The network may ensure the different sets have equivalent and nonconflicting meaning, and the terminal may select one of the sets to interpret for the end-user. The 'Genre' element may contain the following attributes: type and href.

The "type" attribute may signal the level of the 'Genre' element, such as with the values of "main", "second", and "other".

The "href" attribute may signal the controlled vocabulary used in the 'Genre' element.

After reviewing the set of programming guide elements and attributes it was determined that the receiving device still may have insufficient information defined within the programming guide to appropriately render the information in a manner suitable for the viewer. The information included together with the parental ratings, and in particular a content advisory rating, is insufficient to appropriately render the information in a manner suitable for the viewer. The term parental ratings and content advisory ratings may be used interchangeably.

To appropriately render the information the content advisory rating information should be provided via syntax elements and sub-elements. Also content advisory rating should also be indicated for different rating regions in a manner suitable for such rating regions. Further, for each rating region, a rating value may be provided for one or more rating dimensions. In this manner, sufficient information may be defined for the content advisory ratings to appropriately render the information in a manner suitable for the viewer. Preferably, the content advisory rating information is provided in a XML format.

By way of example, one set of content advisory ratings especially suitable for the United States may be TV parental guidelines which may include information related to explicit sexual content, graphic violence, and strong profanity in television programs. One rating may be TV-Y which indicates the program is designed to be appropriate for all children. One rating may be TV-Y7 which indicates the program is designed for children age 7 and above. One rating may be TV-G which indicates most parents would find this program suitable for all ages. One rating may be TV-PG which indicates this program contains material that parents may find unsuitable for younger children. One rating may be TV-14 which indicates this program contains some materials that many parents would find unsuitable for children under 14 years of age. One rating may be TV-MA which indicates that this program is specifically designed to be viewed by adults and therefore may be unsuitable for children under 17. In addition, the rating may include sub-ratings, such as for example, D for suggestive dialogue, L for coarse language, S for sexual content, V for violence, FV for fantasy violence, and E1 for educational and information. With all of these different choices and options, it is desirable to provide suitable information such that it may be rendered in a suitable manner.

By way of example, one set of content advisory ratings especially suitable for the United States may be Motion Picture Association of America (MPAA) film rating system which may include information which empowers families to make informed movie choices.

One rating may be G (General Audiences) which indicates nothing that would offend parents for viewing by children. One rating may be PG (Parental guidance suggested) which indicates parents urged to give "parental guidance". May contain some material parent might not like for their young children.

One rating may be PG-13 (Parents strongly cautioned) which indicates parents are urged to be cautious. Some material may be inappropriate for pre-teenagers.

One rating may be R (Restricted) which indicates contains some adult material. Parents are urged to learn more about the film before taking their young children with them.

One rating may be NC-17 (No one 17 and under admitted) which indicates clearly adult content and children are not admitted.

By way of example, one set of content advisory ratings especially suitable for the South Korea may include information related to all ages, inappropriate for children younger than 7, inappropriate for those younger than 12, in appropriate for children under 15, programs intended for adults only, and exempt.

One rating may be All All(도는 연령 시청가, Mo-deun yeon-ryeong si-cheong-ga) which indicates programming that is appropriate for all ages.

This program usually involves programs designed for children or families. This rating does not have an icon.

One rating may be 7 (7세 이상 시청가, chil-se ii-sang si-choong-ga) which indicates programming that may contain material inappropriate for children younger than 7, and parental discretion should be used.

Some cartoon programming not deemed strictly as "educational", and films rated "G" or "PG" in North America may fall into the 7 category.

One rating may be 12 (12세 이상 시청가, sib-eo-se ii-sang si-cheong-ga) which indicates programs that may deemed inappropriate for those younger than 12, and parental discretion should be used.

Usually used for animations that have stronger themes or violence then those designed for children, or for reality shows that have mild violence, themes, or language.

One rating may be 15 (15세 이상 시청가, sib-o-se ii-sang si-cheong-ga) which indicates programs that contain material that may be inappropriate for children under 15, and that parental discretion should be used.

Examples include most dramas, and talk shows on OTA (over-the-air) TV (KBS, MBC, SBS), and many American TV shows/dramas on Cable TV channels like OCN and OnStyle. The programs that have this rating may include moderate or strong adult themes, language, sexual inference, and violence. As with the TV-MA rating in North America, this rating is commonly applied to live events where the occurrence of inappropriate dialogue is unpredictable.

One rating may include 19 (19세 이상 시청가, sib-gu-se ii-sang si-cheong-ga) which indicates programs that are intended for adults only.

Programs that receive this rating will almost certainly have adult themes, sexual situations, frequent use of strong language and disturbing scenes of violence. One rating may be exempt which indicates knowledge based game shows; lifestyle shows; documentary shows; news; current topic discussion shows; education/culture shows; sports that excludes MMA or other violent sports; and other programs that Korea Communications Standards Commission recognizes. Some of these ratings may include icons while others do not include icons.

As it may be observed, for the United States the rating information is provided in English while for other countries, such as South Korea, the rating information may be provided in another language, such as Korean. In this manner, the content advisory ratings indication should accommodate the differences in the language. In addition, with the frequency of those fluent with different languages or rating systems, the content advisory system should accommodate the selection among a plurality of different ratings systems.

Figures 6, 7A:
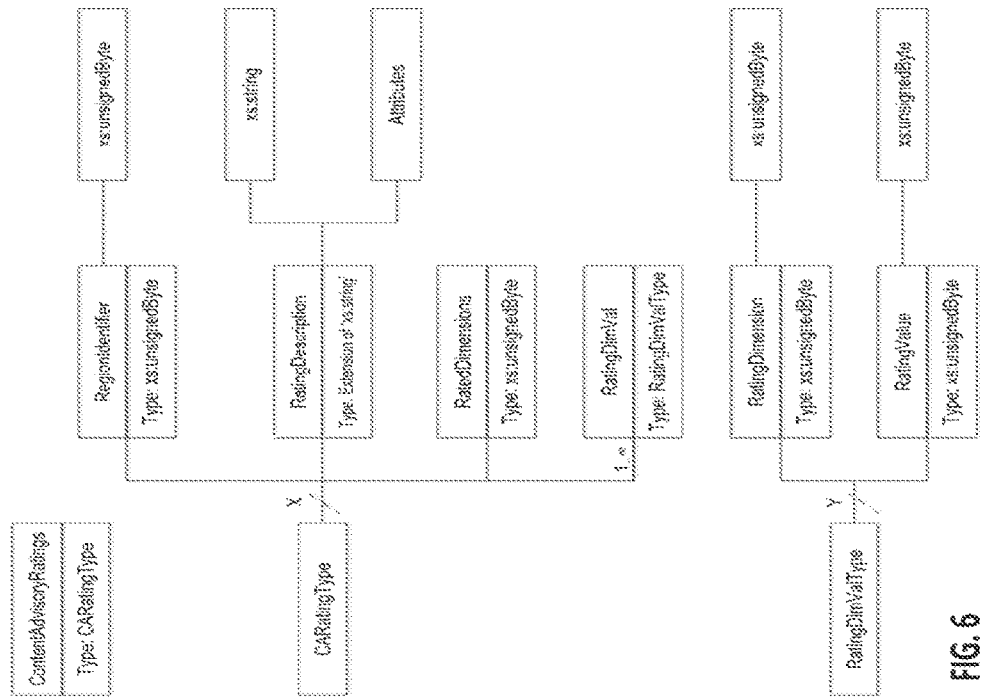
FIG. 6 illustrates a content advisory ratings information structure.
FIG. 7A illustrates a rating description.

Referring to FIG. 5 and to FIG. 6, the content advisory ratings in the service announcement may include a plurality of different elements, sub-elements, and attributes for indicating content advisory ratings information in service announcements along with their semantic meanings. Although the FIGS. 5 and 6 and associated description below refers to service announcement the same information could be transmitted in service signaling or some other service related transmission and reception.

The ContentAdvisoryRatings is an upper element E1 of an entire message which is mandatory for a terminal to support it (e.g., TM) and mandatory for a network to support it (e.g., NM) with no value or multiple values (0.N). The content advisory rating for each rating region may contain one or more of the following elements, namely, RegionIdentifier, RatingDescription, RatedDimensions, and RatingDimVal. The ContentAdvisoryRatings may be of a type CARatingType which indicates the number of content advisory ratings.

The CARatingType may include the Regionidentifier, RatingDescription, RatedDimensions, and RatingDimVal. The RegionIdentifier is a sub-element (e.g., E2) of ContentAdvisoryRatings of a message which is mandatory for a terminal to support it (e.g., TM) and mandatory for a network to support it (e.g., NM) with cardinality of 0 (i.e. element is absent) or 1 element (e.g, cardinality of 0.1). The RegionIdentifier specifies the rating region for which the rating description and rating dimension, and rating value data is specified. If not present the value of RegionIdentifier is inferred to be 0. The Regionidentifier may be of a type xs:unsignedByte which identifies a country or a region or otherwise.

The RatingDescription is a sub-element (e.g., E2) of ContentAdvisoryRatings of a message which is mandatory for a terminal to support it (e.g., TM) and mandatory for a network to support it (e.g., NM) with a cardinality of 1 element indicating a necessary occurrence of this element. The RatingDescription specifies a rating description text which represents the rating suitable for on-screen display. The RatingDescription may include an attribute xml:lang. The RatingDescription may be of a type xs:string.

The xml:lang is an attribute (e.g., A) of sub-element E2 RatingDescription of a message which is mandatory for a terminal to support it (e.g., TM) and mandatory for a network to support it (e.g., NM) with a cardinality of 0 (i.e. element is not present) or 1 element value (e.g, cardinality of 0.1). The xml:lang indicates the language of the RatingDescription expressed with an XML attribute xml:lang. The xml:lang may be of a type xs:string.

The RatedDimensions is a sub-element (e.g., E2) of ContentAdvisoryRatings of a message which is mandatory for a terminal to support it (e.g., TM) and mandatory for a network to support it (e.g., NM) with no element or 1 element (e.g, cardinality of 0.1). The RatedDimensions specifies the number of region specific rating dimensions for which content advisory rating is specified. The RatedDimensions may be of a type xs:unsignedByte which indicates a number of dimensions.

The RatingDimVal is a sub-element (e.g., E2) of ContentAdvisoryRatings of a message which is mandatory for a terminal to support it (e.g., TM) and mandatory for a network to support it (e.g., NM) with no element or multiple elements (cardinality of 0.N). The RatingDimVal specifies the content advisory rating dimension and rating value for each rated dimension. The RatingDimVal may contain RatingDimension and RatingValue. The RatingDimVal may be of a type RatingDimValType.

The RatingDimension is a sub-element (e.g., E3) of RatingDimVal of a message which is mandatory for a terminal to support it (e.g., TM) and mandatory for a network to support it (e.g., NM) with no element or 1 element (e.g., cardinality of 0.1). When not present the value of RatingDimension is inferred to be equal to 0. The RatingDimension specifies a rating dimension index for which the rating value is specified. The RatingDimension may be of a type xs:unsignedByte.

The RatingValue is a sub-element (e.g., E3) of RatingDimVal of a message which is mandatory for a terminal to support it (e.g., TM) and mandatory for a network to support it (e.g., NM) with a cardinality of 1 indicating the element may be present, i.e. is mandatory. The RatingValue specifies rating value for the rating dimension specified in the associated RatingDimension element. In an alternate embodiment the RatingValue may include an attribute xml:lang which specifies the language for the RatingValue. The RatingValue may be of a type xs:unsignedByte.

In another embodiment, the number of occurrences of the RatingDimVal element may be equal to the value inside the RatedDimensions element.

In another embodiment, the value of the element RatingDimension may be less than or equal to the number of rating dimensions_defined in the Rating Region Table.

In another embodiment, the value of the element RatingDimension may be less than or equal to the element dimensions_defined in the Rating Region Table defined in PSIP Content Advisory Descriptor of ATSC A/65: 2013. Program and System Information Protocol, incorporated by reference herein in its entirety.

In another embodiment, the value of the element RatingValue may be less than or equal to the number of rating values defined in the Rating Region Table for the rating dimension indicated by the value of the associated RatingDimension element.

In another embodiment, the value of the element RatingValue may be less than or equal to the number of rating values defined in the element values_defined in the Rating Region Table for the rating dimension indicated by the value of the associated RatingDimension element with values_defined being an element Rating Region Table in PSIP Content Advisory Descriptor of ATSC A/65: 2013, Program and System Information Protocol, incorporated by reference herein in its entirety.

In another embodiment, when not present the value of RatingDimension is inferred to be 0.

In another embodiment, when not present the value of RegionIdentifier is inferred to be 0.

In another embodiment, when not present the value of RegionIdentifier is inferred to be 0, which is inferred to be zero valued rating for the rating dimension(s).

In another embodiment, the RatingDescription element which represents the rating description text follows the semantics of the rating_description_text( ) in PSIP Content Advisory Descriptor of ATSC A/65: 2013, Program and System Information Protocol, incorporated by reference herein in its entirely.

In another embodiment, the RatingDescription string element may be indicated as multiple strings, as illustrated in FIG. 7A.

In an alternative embodiment the cardinality of Regionidentifier may be changed from 0.1 to 1 as illustrated in FIG. 7B. Thus in this case the RegionIdentifier is mandatory.

In an alternative embodiment the cardinality of RatingDimension may be changed from 1 to 0.1 as illustrated in FIG. 7C. Thus in this case the RatingDimension is mandatory.

In another embodiment, E1 of the PSIP Content Advisory Descriptor of ATSC A/65: 2013. Program and System Information Protocol, incorporated by reference herein in its entirety, may include its elements coded as binary data and embedded inside an XML element.

The content advisory rating information may be indicated in the service announcement at one or more locations, namely, (1) inside a Service fragment for a service. (2) inside a Content fragment for a content, and (3) inside a Content fragment for each component of a content.

In one embodiment, an exemplary XML schema is illustrated in FIG. 8 which corresponds to structure in FIG. 6.

In one embodiment, a portion of an exemplary XML schema is illustrated in FIG. 9A. This may correspond to portion of XML schema corresponding to FIG. 8. In another embodiment this portion of XML schema may instead be changed to another portion of XML schema such as that illustrated in FIG. 9B. Thus in one embodiment the portion of XML schema in FIG. 8 corresponding to the XML schema of FIG. 9A may be changed to XML schema of FIG. 9B In another embodiment, some of the use='optional' may be changed to use='required'.

In another embodiment, some of the elements cardinality may be changed from 0.1 to 1.

In another embodiment, for some of the elements the minOccurs="1" may be changed to minOccurs="0".

In another embodiment, for some of the elements the minOccurs="0" may be changed to minOccurs="1".

In another embodiment, for some of the elements the maxOccurs="unbounded" may be changed to maxOccurs="1".

In another embodiment, some of the elements above may be changed from E2 to E1 or from E1 to E2 or from Ej to Ei for any j and i.

In another embodiment, the cardinality of some of the elements may be changed. For example cardinality may be changed from "1" to "1.N" or cardinality may be changed from "1" to "0.N" or cardinality may be changed from "1" to "0.1" or cardinality may be changed from "0.1" to "0.N" or cardinality may be changed from "0.N" to "0.1".

In another embodiment, some of the elements could instead be signaled as attributes.

In another embodiment, some of the required elements may be changed to optional elements or vice-a-versa.

In another embodiment, some of the "NM/TM" values in the "category" may be changed to "NM/TO" or "NO/TM" or "NO/TO"., with TM means mandatory for a terminal to support it and NM means mandatory for a network to support it. TO means optional for a terminal to support it and NO means optional for a network to support it.

In another embodiment, instead of XML some other format, e.g. JSON/CSV/BNF/ABNF/EBNF, may be used for representing the same information conveyed in the XML format.

In another embodiment, additional namespace qualifier may be added for an xml element/attributes/type. For example <xs:element name="CARatingType"> may instead be called <xs:complexType name="atsc3:CARatingType"> or <xs:complexType name="atsc:CARatingType"> where atsc3 and atsc respectively indicate namespace.

In another embodiment, for example <xs:element name="RegionIdentifier" . . . may instead be called <xs: element name="atsc3:RegionIdentifier" . . . or <xs:element name="atsc:RegionIdentifier" . . . where atsc3 and atsc respectively indicate namespace.

In another embodiment, elements ContentAdvisoryRatings, RegionIdentifier, RatingDescription, RatedDimensions, RatingDimVal, RatingDimension, RatingValue may instead be called car, ri, rde, rdis, rdv, rd, rv respectively. Other such abbreviations am also considered to be in the scope of this invention. The benefit here is to save number of bytes required to signal the XML data. Thus when listing several strings the representation as an example <rd>5</rd> will require less bytes than <RatingDimension> String 1</RatingDimension>.

By way of example, referring again to FIG. 6, there may be N number of CARatingTypes for the content advisory rating. By way of example, the RegionIdentifier may be a number that refers to a rating system of a particular country (e.g., South Korea or United States) or a geographic region or otherwise. By way of example, the RatingDescription may be program's rating in abbreviated form or otherwise suitable for onscreen display. For example this may be "TV-Y7 FV" to indicate program directed to older children (with age 7 and above) with fantasy violence as per TV parental guidelines ratings. By way of example, the RatedDimensions may indicate the number of different ratings within the particular region previously identified that is included within the particular syntax structure. By way of example, RatingDimVal is a structure that provides for the number of different ratings of RatedDimensions, and are provided as pairs of the RatingDimension and RatingValue for the particular content. The RatingDimension indicates which of the ratings (e.g., as an index into a table) and the RatingValue indicates the value of that RatingValue. By way of example, a first RatingDimension may be MPAA (e.g., an index within a Rating Region Table) with a RatingValue of PG, a second RatingDimension may be TV Parental Guidelines (e.g., an index within a Rating Region Table) with a RatingValue of TV:PG. In this manner, the syntax supports multiple rating systems for a particular region.

For an alternative embodiment Emb1, referring to FIG. 10A and to FIG. 22A, the content advisory ratings in the service announcement may include a binary coded element along with its semantic meaning. In this embodiment the PSIP Content Advisory Descriptor including its elements could be coded as binary data according to the syntax specified for the descriptor in A/65: 2013 and then it can be embedded inside an XML element as specified in FIG. 10A and shown in FIG. 22A. Although FIG. 10A and FIG. 22A and their associated description refers to service announcement the same information could be transmitted in service signaling or some other service related transmission and reception.

For an alternative embodiment Emb2, referring to FIG. 10B and to FIG. 22B, the content advisory ratings in the service announcement may include a binary coded element along with its semantic meaning. In this embodiment the PSIP Content Advisory Descriptor including its elements could be coded as binary data according to the syntax specified for the descriptor in A/65: 2013 and may be further encoded using base64 encoding and then it can be embedded inside an XML element as specified in FIG. 10B and shown in FIG. 22B.

Although FIG. 10B and FIG. 22B and their associated description refers to service announcement the same information could be transmitted in service signaling or some other service related transmission and reception.

Further variants for alternative embodiments Emb1 and Emb2 are described below. In this case the Content Advisory Descriptor encoded and signaled/indicated inside atsc:ContentAdvisoryRatings element coded with the date type string or base64Binary may use the syntax shown in FIG. 11. In FIG. 11 compared to PSIP Content Advisory Descriptor of A65/2013, unnecessary elements are removed and some elements are modified.

The main changes in content advisory ratings description of FIG. 11 compared to PSIP content advisory descriptor of A65/2013 include the following: (1) Elements descriptor_tag is removed. This is because the defined XML structure is encapsulated inside <ContentAdvisoryRatings> element which is adequate for unambiguous parsing. (2) Elements descriptor_length is removed. This is because the defined XML structure allows parser to know the length. (3) The reserved element 2 bits in the prefix of the byte for rating_region_count element are changed to '00' from '11'. This allows the value indicated in rating_region_count to be read in this version of the specification to be read without using a mask for the last 6 bits. (4) The reserved element 4 bits in the prefix of the byte for rating_value element are changed to '0000' from '1111'. This allows the value indicated in rating_value to be read in this version of the specification to be read without using a mask for the last 4 bits.

Additional details and alternative embodiments for the location for content advisory rating information is described below. As previously described the content advisory rating information may be indicated in the service announcement at one or more locations, namely, (1) inside a Service fragment for a service. (2) inside a Content fragment for a content, and/or (3) inside a Content fragment for each component of a content.

When the content advisory rating information is indicated inside a ATSC/OMA BCAST 'Service' fragment using various elements and attributes corresponding to FIG. 5, it could be indicated as shown in FIG. 12.

When the content advisory rating information is indicated inside a ATSC/OMA BCAST 'Service' fragment, the variant from embodiment E1 which indicates the element ContentAdvisoryRatings as a string with binary encoded data corresponding to PSIP Content Advisory Descriptor corresponding to FIG. 10A could be indicated as shown in FIG. 13.

When the content advisory rating information is indicated inside a ATSC/OMA BCAST 'Service' fragment, the variant from embodiment E2 which indicates the element ContentAdvisoryRatings as a base64Binary with base64 encoded data corresponding to PSIP Content Advisory Descriptor corresponding to FIG. 10B could be indicated as shown in FIG. 14.

The content advisory ratings information could be included in content fragment instead of in service fragment or in addition to in the service fragment. When content advisory information is included in both the service fragment and the content fragment then the information in the content fragment over-rides the information in the service fragment.

When the content advisory rating information is indicated inside a ATSC/OMA BCAST 'Content' fragment using various elements and attributes corresponding to FIG. 5, it could be indicated as shown in FIG. 15.

When the content advisory rating information is indicated inside a ATSC/OMA BCAST 'Content' fragment, the variant from embodiment E1 which indicates the element ContentAdvisoryRatings as a string with binary encoded data corresponding to PSIP Content Advisory Descriptor corresponding to FIG. 10A could be indicated as shown in FIG. 16.

When the content advisory rating information is indicated inside a ATSC/OMA BCAST 'Content' fragment, the variant from embodiment E2 which indicates the element ContentAdvisoryRatings as a base64Binary with base64 encoded data corresponding to PSIP Content Advisory Descriptor corresponding to FIG. 10B could be indicated as shown in FIG. 17.

The content advisory ratings information could be included in content fragment additionally for each component in addition to as defined above. Alternatively the content advisory ratings information could be included in the content fragment only for one or more components. Also this information may be included for each component of a content in content fragment instead of in service fragment or in addition to in the service fragment. When content advisory information is included in both the service fragment and the content fragment then the information in the content fragment over-rides the information in the service fragment. Inside the content fragment if content advisory information is included in both outside of each content components and inside one or more content components, then the information inside a content component over-rides the information outside the content component and also over-rides the information in the service fragment.

When the content advisory rating information is indicated inside a ATSC/OMA BCAST 'Content' fragment for each of the components of the content it could be indicated as shown in FIGS. 18A to 18C.

In an variant embodiment element ContentAdvisoryRatings included as the sub-element inside each of the elements AudioComponent, VideoComponent, CCComponent, AppComponent could be indicated as shown in FIG. 19.

In another variant element ContentAdvisoryRatings included as the sub-element inside each of the elements AudioComponent, VideoComponent, CCComponent, AppComponent could be indicated as shown in FIG. 20. This could be the case which indicates the element ContentAdvisoryRatings as a string with binary encoded data corresponding to PSIP Content Advisory Descriptor.

In another variant element ContentAdvisoryRatings included as the sub-element inside each of the elements AudioComponent, VideoComponent, CCComponent, AppComponent could be indicated as shown in FIG. 21. This could be the case which indicates the element ContentAdvisoryRatings as a string with base64 encoded data corresponding to PSIP Content Advisory Descriptor.

Although the above variant shows the ContentAdvisoryRatings element and its sub-elements to be included for each of the elements AudioComponent, VideoComponent, CCComponent, AppComponent, in another embodiment ContentAdvisoryRatings element and its sub-elements may be included for only one or more of the elements AudioComponent, VideoComponent, CCComponent. AppComponent. Also in another embodiment the ContentAdvisoryRatings element and its sub-elements may be included as sub-elements of any other element inside Content fragment. In particular they may be included as sub-elements of any presentable component element.

In one embodiment, an exemplary XML schema is illustrated in FIG. 23A which corresponds to structure in FIG. 10A.

In one embodiment, an exemplary XML schema is illustrated in FIG. 23B which corresponds to structure in FIG. 10B.

Additional embodiments are described next.

A new RatingValueString element is proposed for content advisory rating information. This element allows keeping a content advisory rating information for a service/content/component unchanged even when Rating Region Table is changed (for example by insertion of a new rating) when graduated scale is used.

Additional constraints related to RatingValue and RatingValueString elements of content advisory information are described.

Figure 29:
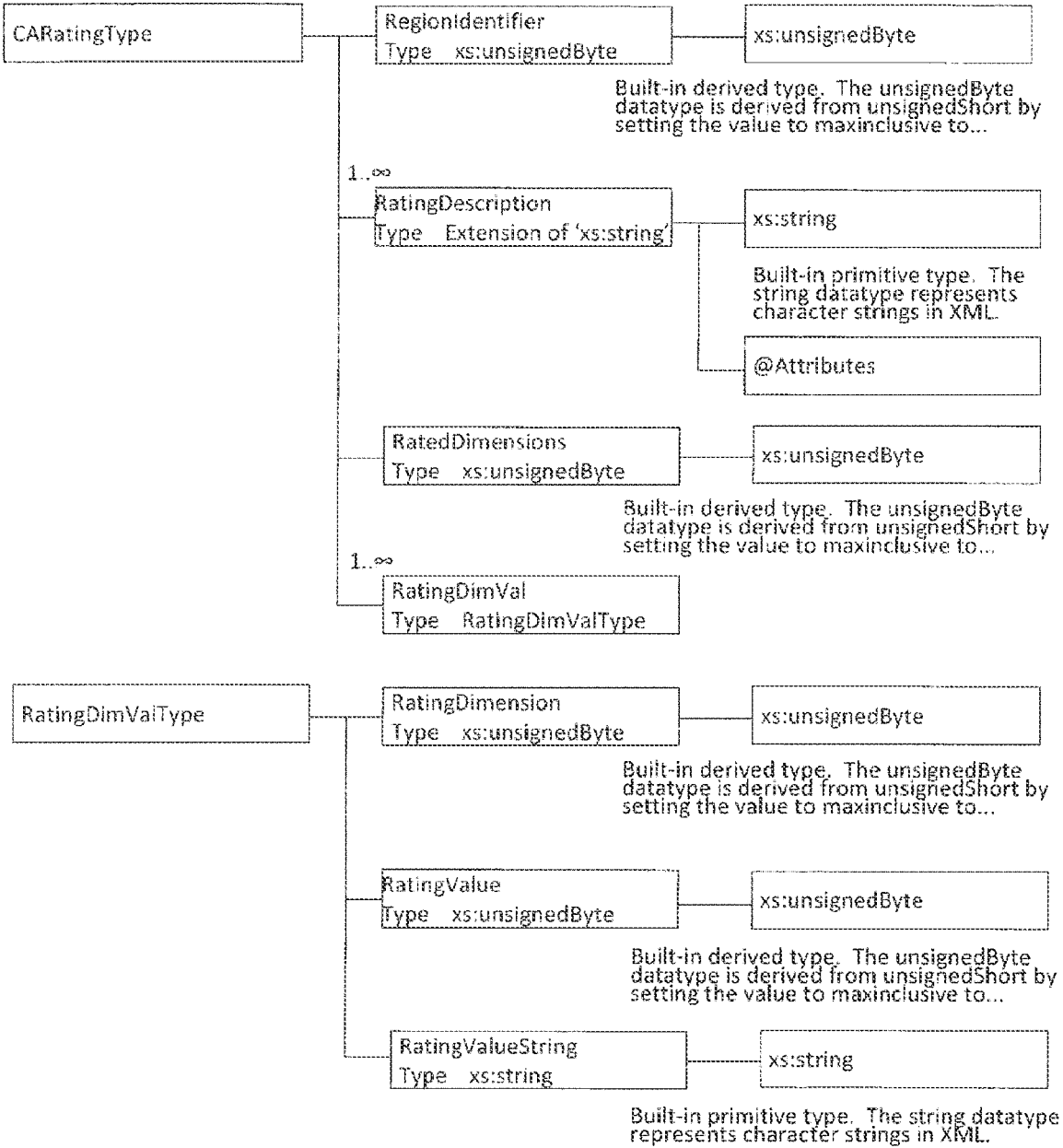
FIG. 29 illustrates a content advisory ratings information structure.

For an alternative embodiment Emb3, referring to FIG. 24 and to FIG. 29, the content advisory ratings in the service announcement may include elements, sub-elements and attributes as shown. In this embodiment a new RatingValueString element is proposed for content advisory rating information. The RatingValueString element allows keeping a content advisory rating information for a service/content/component unchanged even when Rating Region Table is changed (for example by insertion of a new rating in between two ratings) when graduated scale is used. Although FIG. 24 and FIG. 29 and their associated description refers to service announcement the same information could be transmitted in service signaling or some other service related transmission and reception.

Additionally the following constraints apply in reference to FIG. 24 and FIG. 29.

The number of occurrences of the RatingDimVal element may be equal to the value inside the RatedDimensions element.

The value of the element RatingDimension may be less than or equal to the number of rating dimensions defined in the Rating Region Table.

In one embodiment the value of the element RatingDimension may be less than or equal to the element dimensions_defined in the Rating Region Table.

The value of the element RatingValue may be less than or equal to the number of rating values defined in the Rating Region Table for the rating dimension indicated by the value of the associated RatingDimension element.

In one embodiment the value of the element RatingValue may be less than or equal to the number of rating values defined in the element values_defined in the Rating Region Table for the rating dimension indicated by the value of the associated RatingDimension element.

The value of the element RatingValueString may be equal to one of the values defined (rating_value_text( )) in the Rating Region Table for the rating dimension indicated by the value of the associated RatingDimension element.

There may be only one of the RatingValue or RatingValueString element present inside a RatingDimValue element.

When graduated_scale value in the Rating Region Table for the rating dimension indicated by the value of the RatingDimension element inside a RatingDimVal element is equal to 1 the RatingValueString element may be present inside this RatingDimVal element.

In an Additional Embodiment

When graduated_scale value in the Rating Region Table for the rating dimension indicated by the value of the RatingDimension element inside a RatingDimVal element is equal to 0 the RatingValue element may be present inside this RatingDimVal element.

When graduated_scale value in the Rating Region Table for the rating dimension indicated by the value of the RatingDimension element inside a RatingDimVal element is equal to 1 the RatingValue element may not be present inside this RatingDimVal element.

When graduated_scale value in the Rating Region Table for the rating dimension indicated by the value of the RatingDimension element inside a RatingDimVal element is equal to 0 the RatingValueString element may not be present inside this RatingDimVal element.

When not present the value of RatingDimension is inferred to be equal to 0.

When not present the value of RegionIdentifier is inferred to be 0.

When not present the value of Regionidentifier is inferred to be 0, which is inferred to be zero valued rating for the rating dimension(s).

For an alternative embodiment Emb4, referring to FIG. 25, FIG. 26 and to FIG. 30, the content advisory ratings in the service announcement may be defined based on IPTV electronic program guide metadata specification ATIS-08000020 section "5.7.3 RRT Parental Guidance Type" with the extensions and constraints as described below.

In this case the element RatingValueString may be added as sub-element of Dimension element as shown in FIG. 25.

Also in this case the attribute xml:lang may be added for the RatingDescriptionText element as shown in FIG. 26.

In a further variant embodiment elements, sub-elements and attributes for indicating content advisory ratings information in service announcement along with their semantics meaning in this case is described in FIG. 27.

In a yet another variant embodiment elements, sub-elements and attributes for indicating content advisory ratings information in service announcement along with their semantics meaning in this case is described in FIG. 28.

Additionally one or more of the following constraints apply in reference to FIG. 25-28.

The value of the element RatingDimension may be less than or equal to the number of rating dimensions defined (dimensions_defined) in the Rating Region Table.

The value of the element RatingValue may be less than or equal to the number of rating values defined (values defined) in the Rating Region Table for the rating dimension indicated by the value of the associated RatingDimension element.

The value of the element RatingValueString may be equal to one of the values defined (rating_value_text( )) in the Rating Region Table for the rating dimension indicated by the value of the associated RatingDimension element.

There may be only one of the RatingValue or RatingValueString element present inside a RatingDimValue element.

When graduated_scale value in the Rating Region Table for the rating dimension indicated by the value of the RatingDimension element inside a RatingDimVal element is equal to 1 the RatingValueString element may be present inside this RatingDimVal element.

When graduated_scale value in the Rating Region Table for the rating dimension indicated by the value of the RatingDimension element inside a RatingDimVal element is equal to 0 the RatingValue element may be present inside this RatingDimVal element.

When graduated_scale value in the Rating Region Table for the rating dimension indicated by the value of the RatingDimension element inside a RatingDimVal element is equal to 1 the RatingValue element may not be present inside this RatingDimVal element.

When graduated_scale value in the Rating Region Table for the rating dimension indicated by the value of the RatingDimension element inside a RatingDimVal element is equal to 0 the RatingValueString element may not be present inside this RatingDimVal element.

Cardinality of RatingDimension is 0.1. When not present the value of RatingDimension is inferred to be equal to 0.

When not present the value of ratingRegion is inferred to be 0.

When not present the value of ratingRegion is inferred to be 0, which is inferred to be zero valued rating for the rating dimension(s).

Although FIG. 25, FIG. 26, FIG. 27, FIG. 28 and FIG. 30 and their associated description refers to service announcement the same information could be transmitted in service signaling or some other service related transmission and reception.

In one embodiment, an exemplary XML schema is illustrated in FIG. 31 which corresponds to structure in FIG. 29.

Figure 30:
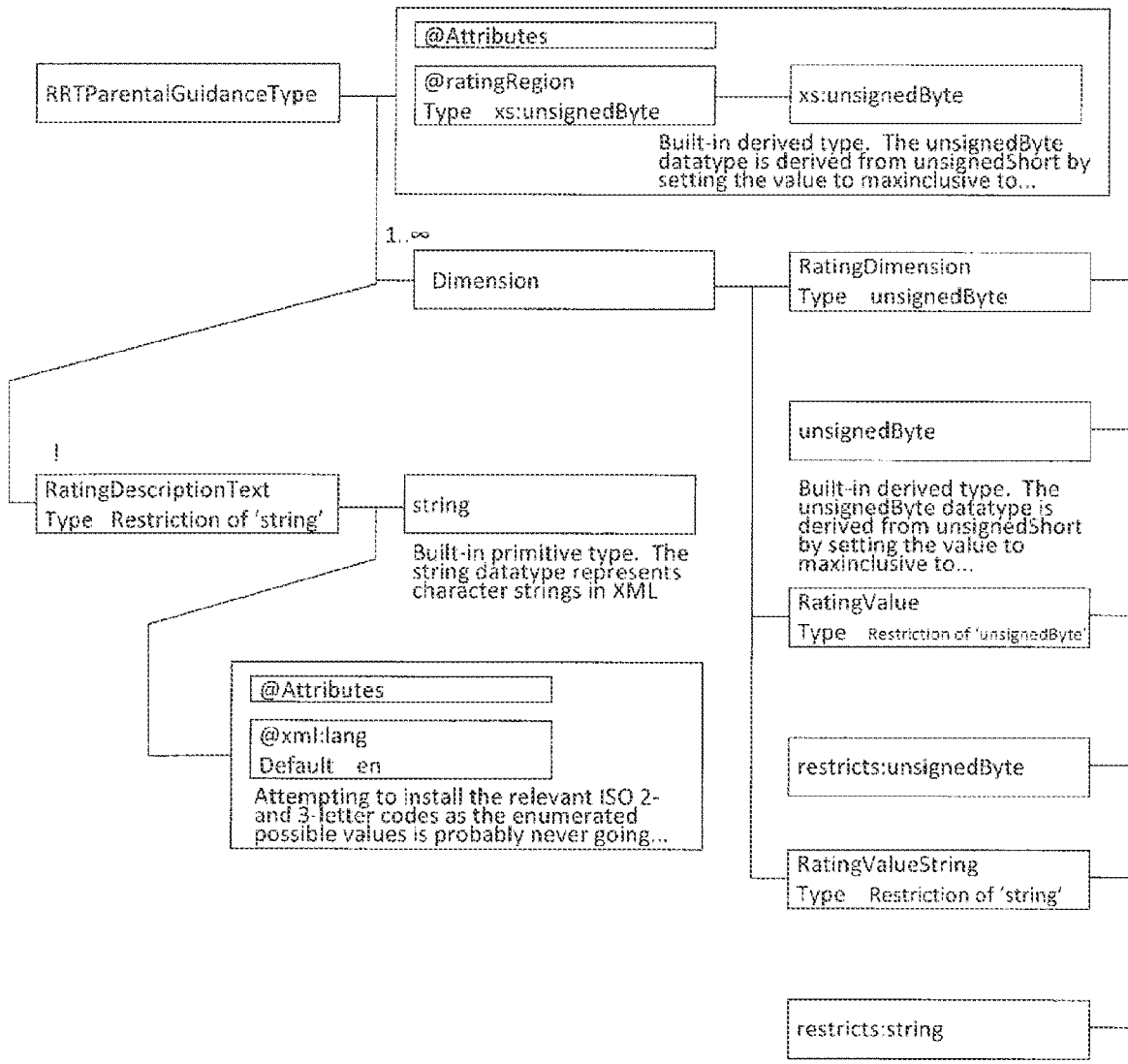
FIG. 30 illustrates a content advisory ratings information structure.

In one embodiment, an exemplary XML schema is illustrated in FIG. 32 which corresponds to structure in FIG. 30.

In a variant embodiment the location for indicating content advisory ratings information may be as defined below.

The content advisory rating information can be indicated in service announcement at one or more of the following locations:

Referring to FIG. 33, in an example content advisory rating information (ContentAdvisoryRatings element) can be indicated inside an ATSC/OMA BCAST 'Service' fragment inside PrivateExt element as shown in "Content Advisory Ratings in Service Announcement inside a Service fragment".

Referring to FIG. 34, in an example the content advisory ratings information (ContentAdvisoryRatings element) can be included in 'content' fragment instead of in 'service' fragment or in addition to in the 'service' fragment as shown in "Content Advisory Ratings in Service Announcement inside a Content fragment". When content advisory information is included in both the 'service' fragment and the 'content' fragment then the information in the 'content' fragment over-rides the information in the 'service' fragment.

The content advisory ratings information (ContentAdvisoryRatings element) could be included in 'content' fragment additionally for each component in addition to as described previously. When content advisory information is included in both the 'service' fragment and the 'content' fragment then the information in the 'content' fragment over-rides the information in the 'service' fragment. Inside the 'content' fragment if content advisory information is included in both outside of each content components and inside one or more content components, then the information inside a content component over-rides the information outside the content component and also over-rides the information in the 'service' fragment.

By way of example, the service announcement may be defined as information regarding the ATSC services and content available.

By way of example, the service guide may be a function of presenting service announcement.

By way of example, the service fragment may be defined as a portion of service announcement that describes an ATSC service, corresponding to service fragment in OMA BCAST Service Guide model.

By way of example, the content fragment may be defined as a portion of service announcement that describes an ATSC program or content item, corresponding to the content fragment in OMA BCAST Service Guide model.

By way of example, the schedule fragment may be defined as a portion of service announcement that describes the presentation scheduling of content in an ATSC service, corresponding to schedule fragment in OMA BCAST Service Guide model.

The overall content advisory ratings may include a Rating Region Table provided together with the service signaling or some other service related transmission and reception. Referring to FIG. 35 and FIG. 36, by way of example, the Rating Region Table (RRT) may include the syntax defined in Annex F of A/331, ATSC Candidate Standard: Signaling, Delivery, Synchronization, and Error Protection, Doc. S33-174r1, Jan. 5, 2016, incorporated by reference herein in its entirety. A broadcast emission may include one or more RRTs, each corresponding to a particular identified value of Rating Region. RRTs may be delivered encoded with XML instance documents. Each instance may contain at least one, but not more than two, RRTs. By way of example, the service signaling may be the data provided together with the media content, such as the audio and video content. For example, the service signaling may include the data provided together with a broadcast or Internet stream of audiovisual content. For example service signaling may provide data that is necessary to obtain to access the described service and to present it to a viewer on a receiver such as a television.

While signaling the Rating Region Table in the service signaling provides the data to the receiving device, unfortunately, the Rating Region Table is often not available to the service announcement (e.g., service guide, electronic programming guide) which is often provided temporally far in advance of the service signaling for any particular content. The service announcement preferably does not include information sufficient to access the particular service, content and/or channel, such as the content's IP address or physical layer parameters or radio frequency channel information, whereas the service signaling preferably includes information sufficient to access the particular service, content and/or channel, such as the content's IP address or physical layer parameters or radio frequency channel information. Without the Rating Region Table being available to the service announcement, it is often problematic for the service announcement to properly process and render the service announcement. For example, the service announcement may be unable to determine what a particular rating refers to, since the Rating Region Table is not yet available, thus making the resulting rendering of the service announcement to the user incomplete or otherwise inaccurate. The Rating Region Table is preferably signaled together with the service announcement so that the service announcement may be suitably decoded, processed, and/or rendered. More particularly, the Rating Region Table is preferably signaled together with the content advisory rating in the service announcement.

Referring to FIG. 37, an exemplary service level private extension table is illustrated. The service level private extension may include an ATSC3ServiceExtension element that indicates additional information about the ATSC 3.0 service. The service level private extension may include an icon element indicating a URL pointing to the icon used to represent the service in the electronic service guide. The service level private extension may include a MajorChannelNum and a MinorChannelNum to indicate the major channel number of the service and the minor channel number of the service, respectively. The service level private extension may also include a Rating Region Tables element that indicates the particular Rating Region Table to be used, and the syntax thereof. Further, the contents of the Rating Region Tables in the service announcement preferably matches those also sent in the service signaling. In an example the ATSC3ServiceExtension element in FIG. 37 may be instead named ATSC3ServicePrivateExt.

The XML schema for Rating Region Tables element in FIG. 37 may be as shown below:

```
<xs:element name="RatingRegionTables" type="rrt:RRsType""
    minOccurs="0" maxOccurs="1"/>
```

The overall XML schema for ATSC3ServiceExtension and its sub-elements may be as shown below: P-2712

```
<xs:complexType name="ATSC3ServiceExtensionType">
    <xs:sequence>
        <xs:element name="Icon" type="xs:anyURI" minOccurs="0"
            maxOccurs="unbounded"/>
        <xs:element name="MajorChannelNum" type="sa:LangString"
            minOccurs="0" maxOccurs="1"/>
        <xs:element name="MinorChannelNum" type="sa:LangString"
            minOccurs="0" maxOccurs="1"/>
        <xs=element name="RatingRegionTables" type="rrt:RRsType""
            minOccurs="0" maxOccurs="1"/>
    </xs:sequence>
</xs:complexType>
```

The actual XML schema for Rating Region Table may be as shown in FIGS. 45A and 45B. This XML schema in FIGS. 45A and 45B may correspond to Rating Region Table structure shown in FIG. 35 and FIG. 36.

While the Rating Region Table based content advisory ratings are sufficient for a substantial amount of content, there exist cases where content advisory rating information based on methods other than the defined Rating Region Table is more desirable to describe the ratings of particular associated content. Content advisory rating not corresponding to defined RRT may be referred to as non-RRT Content Advisory Ratings. These are described next. Referring to FIG. 38, an exemplary non RRT content advisory rating information table is illustrated. The non RRT content advisory rating information table may include an element OtherRatings that indicates content advisory ratings not corresponding to a defined Rating Region Table. The OtherRatings element may include a pair of attributes. The first attribute may be a @ratingscheme attribute that specifies the scheme URI for the rating described by a RatingInformation element. The second attribute may be a @ratingInformation attribute that corresponds to the rating scheme defined by @ratingScheme attribute. The interpretation of the @ratingInformation attribute may be specified by appropriate regional authorities. More than one OtherRatings elements may be included as indicated by the cardinality of 0.N.

The OtherRatings may be included within the service fragment and/or within the content fragment. With a structure permitting multiple OtherRatings to be included with the service fragment and content fragment, it is preferable that each OtherRatings element inside the Service fragment has a unique @ratingScheme value and each OtherRatings element inside the Content fragment has a unique @ratingScheme value. Thus it may be constraint for conformance that:

Each OtherRatings element inside the Service fragment shall have a unique @ratingScheme value. Each OtherRatings element inside the Content fragment shall have a unique @ratingScheme value.

Exemplary XML schemas for the OtherRatings element is illustrated in FIG. 39 and FIG. 40. These may correspond to the OtherRatings structure shown in FIG. 38.

Referring to FIG. 41, an alternative method for indicating the OtherRatings is illustrated. The method may include an attribute @ratingScheme that specifies the scheme URI for the content advisory ratings described by RatingInformationString element or the data included in RatingInformationData. The RatingInformationString element may include rating information corresponding to the rating scheme defined by @ratingScheme. The RatingInformationData is a container element for rating information value data corresponding to the rating scheme defined by @ratingScheme. Preferably, only RatingInformationString or RatingInformationData, but not both, is included in any particular instance of OtherRatings.

Referring to FIG. 42, an alternative method for indicating the OtherRatings is illustrated that is similar to FIG. 41. Preferably, only RatingInformationString or RatingInformationData, but not both, is included in any particular instance of OtherRatings.

An exemplary XML schema for OtherRatings may be as follows:

```
<xs:element name="OtherRatings" type="sa:OtherRatingType"/>
<xs:complexType name="OtherRatingType">
    <xs:sequence>
        <xs:choice>
            <xs:element name="RatingInformationString" type="xs:string" minOccurs="1"/>
            <xs:element name="RatingInformationData" type="sa:RatingContainerType" minOccurs="1"/>
        </xs:choice>
    </xs:sequence>
```

-continued

```
    <xs:attribute name="ratingScheme" type="xs:anyURI"
        use="required" />
</xs:complexType>
<xs:complexType name="RatingContainerType">
    <xs:sequence>
        <xs:any namespace="##other" processContents="lax"
minOccurs="0" maxOccurs="unbounded"/>
    </xs:sequence>
</xs:complexType>
```

This XML schema may correspond to OtherRatings structure shown in FIG. 41.

The non RRT content advisory rating information may be indicated in service announcement at any suitable location. One suitable location is inside a service fragment for a service. The non RRT content advisory rating information (OtherRatings element) may be indicated inside a service fragment. Another suitable location is inside a Content fragment for a program or content. The non RRT content advisory ratings information (OtherRatings element) may be included in Content fragment instead of in service fragment or in addition to in the service fragment. When non RRT content advisory information is included in both the service fragment and the content fragment then the information in the content fragment over-rides the information in the service fragment.

An exemplary service fragment including OtherRatings element is illustrated in FIG. 43.

An exemplary content fragment including OtherRatings element is illustrated in FIG. 44.

It is noted that the words "non RRT" above may be used interchangeably with the words "non-RRT".

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method of receiving content advisory rating information, the method comprising:
   receiving a service announcement which is information regarding an ATSC services and content, wherein the service announcement includes a service fragment describing an ATSC service and a content fragment describing an ATSC program or content item; and parsing a content advisory rating not corresponding to a defined rating region table in the service announcement, wherein:

the content advisory rating not corresponding to the defined rating region table is indicated at one or more of following locations:

(i) inside the service fragment, and (ii) inside the content fragment instead of the service fragment or in addition to the service fragment, and the content advisory rating not corresponding to the defined rating region table in the service fragment is over-rode by the content advisory rating not corresponding to the defined rating region table in the content fragment, in a case that the content advisory rating not corresponding to defined the rating region table is included in both the service fragment and the content fragment.

2. The method of claim 1, wherein:

the service fragment includes a service level private extension element containing an icon element, a major channel number element, and a minor channel number element, the service level private extension element includes rating rejoin tables, and contents of the rating rejoin tables in the service announcement match rating rejoin tables sent in service signaling.

3. The method of claim 1, wherein:

the content advisory rating information not corresponding to the defined rating region table includes a rating scheme attribute and one of a rating information string element and a rating information data element.

4. A method of signaling content advisory rating information, the method comprising:

signaling a service announcement which is information regarding an ATSC services and content, wherein the service announcement includes a service fragment describing an ATSC service and a content fragment describing an ATSC program or content item, wherein:

the service announcement includes a content advisory rating not corresponding to a defined rating region table, the content advisory rating not corresponding to the defined rating region table is indicated at one or more of following locations:

(i) inside the service fragment, and (ii) inside the content fragment instead of the service fragment or in addition to the service fragment, and the content advisory rating not corresponding to the defined rating region table in the service fragment is over-rode by the content advisory rating not corresponding to the defined rating region table in the content fragment, in a case that the content advisory rating not corresponding to defined the rating region table is included in both the service fragment and the content fragment.

5. A device for receiving content advisory rating information, the device comprising:

a processor, and a memory associated with the processor; wherein the processor is configured to perform the following steps:

receiving a service announcement which is information regarding an ATSC services and content, wherein the service announcement includes a service fragment describing an ATSC service and a content fragment describing an ATSC program or content item, and parsing a content advisory rating not corresponding to a defined rating region table in the service announcement, wherein:

the content advisory rating not corresponding to the defined rating region table is indicated at one or more of following locations:

(i) inside the service fragment, and (ii) inside the content fragment instead of the service fragment or in addition to the service fragment, and the content advisory rating not corresponding to the defined rating region table in the service fragment is over-rode by the content advisory rating not corresponding to the defined rating region table in the content fragment, in a case that the content advisory rating not corresponding to defined the rating region table is included in both the service fragment and the content fragment.

* * * * *